(12) United States Patent
Palmer et al.

(10) Patent No.: US 9,574,563 B2
(45) Date of Patent: *Feb. 21, 2017

(54) SYSTEM AND METHOD OF WRAPPING FLOW IN A FLUID WORKING APPARATUS

(71) Applicant: HARRIS CORPORATION, Melbourne, FL (US)

(72) Inventors: William Robert Palmer, Melbourne, FL (US); Kenneth E. Brace, Indian Harbour Beach, FL (US)

(73) Assignee: Harris Corporation, Melbourne, FL (US)

( * ) Notice: Subject to any disclaimer, the term of this patent is extended or adjusted under 35 U.S.C. 154(b) by 951 days.

This patent is subject to a terminal disclaimer.

(21) Appl. No.: 13/859,106

(22) Filed: Apr. 9, 2013

(65) Prior Publication Data

US 2014/0300109 A1    Oct. 9, 2014

(51) Int. Cl.
    *F04D 5/00*       (2006.01)
    *H02K 7/18*       (2006.01)
    (Continued)

(52) U.S. Cl.
    CPC ............... *F04D 5/002* (2013.01); *F04D 1/06* (2013.01); *F04D 17/12* (2013.01); *F04D 23/008* (2013.01); *H02K 7/1823* (2013.01)

(58) Field of Classification Search
    CPC .......... F04D 17/12; F04D 1/06; F04D 23/008; F04D 5/002; H02K 7/1823
    (Continued)

(56) References Cited

U.S. PATENT DOCUMENTS

| 945,742 A | 1/1910 | Boeckel et al. |
| 3,007,306 A | 11/1961 | Martin et al. |

(Continued)

FOREIGN PATENT DOCUMENTS

| DE | 3327838 A1 | 12/1983 |
| DE | 198 04 845 A1 | 8/1999 |

(Continued)

OTHER PUBLICATIONS

International Preliminary Report on Patenability mailed Apr. 3, 2014, in applicaiton Serial No. PCT/US2012/056524 in the name of Harris Corporation.

(Continued)

*Primary Examiner* — Nicholas J Weiss
*Assistant Examiner* — Paul Thiede
(74) *Attorney, Agent, or Firm* — Fox Rothschild LLP; Robert J. Sacco; Carol E. Thorstad-Forsyth

(57) ABSTRACT

A fluid working apparatus (100) including a housing structure (130) with an inlet (132) and an outlet (133). A working assembly positioned in the housing (130) has an inlet side and an outlet side with the at least one rotor (114) having a plurality of blades (115) positioned between the inlet and outlet sides. At least one return assembly (140, 142) is configured to return fluid flow from the outlet to the inlet side of the working assembly whereby a working fluid passes through the housing inlet (132), from the inlet side of the working assembly to the outlet side thereof while workingly engaging a first subset of the rotor blades (115), through the at least one return assembly (140, 142), from the inlet side of the working assembly to the outlet side thereof while workingly engaging a second subset of the rotor blades (115), and out of the housing outlet (133). A method of working a fluid is also provided.

21 Claims, 34 Drawing Sheets

(51) Int. Cl.
*F04D 1/06* (2006.01)
*F04D 17/12* (2006.01)
*F04D 23/00* (2006.01)
*F04D 1/04* (2006.01)

(58) Field of Classification Search
USPC .. 415/1, 60, 55.3, 55.4, 57.1, 185; 60/39.43, 39.44, 269
See application file for complete search history.

(56) References Cited

U.S. PATENT DOCUMENTS

| | | | |
|---|---|---|---|
| 3,070,348 A | 12/1962 | Stewart | |
| 3,070,349 A | 12/1962 | Stewart | |
| 3,636,706 A | 1/1972 | Minto | |
| 3,704,570 A | 12/1972 | Gardenier | |
| 3,834,133 A | 9/1974 | Bow | |
| 3,935,710 A | 2/1976 | Dickinson | |
| 3,973,865 A | 8/1976 | Mugele | |
| 4,009,587 A | 3/1977 | Robinson, Jr. et al. | |
| 4,027,993 A | 6/1977 | Wolff | |
| 4,106,294 A | 8/1978 | Czaja | |
| 4,122,680 A | 10/1978 | Isshiki et al. | |
| 4,196,594 A | 4/1980 | Abom | |
| 4,252,543 A | 2/1981 | Giles | |
| 4,258,551 A | 3/1981 | Ritzi | |
| 4,283,211 A | 8/1981 | Ehrlich et al. | |
| 4,287,138 A | 9/1981 | Buckner | |
| 4,291,538 A | 9/1981 | Husain et al. | |
| 4,366,675 A | 1/1983 | Nishioka | |
| 4,372,124 A | 2/1983 | Newton et al. | |
| 4,372,759 A | 2/1983 | Sederquist et al. | |
| 4,448,030 A | 5/1984 | Moss | |
| 4,484,446 A | 11/1984 | Goldsberry | |
| 4,548,043 A | 10/1985 | Kalina | |
| 4,569,207 A | 2/1986 | James | |
| 4,660,511 A | 4/1987 | Anderson | |
| 4,905,481 A | 3/1990 | Scaringe et al. | |
| 4,926,643 A | 5/1990 | Johnston | |
| 4,935,221 A | 6/1990 | Bronfenbrenner et al. | |
| 5,137,681 A | 8/1992 | Dougherty | |
| 5,156,534 A * | 10/1992 | Burgy | F02K 9/48 415/60 |
| 5,269,148 A | 12/1993 | Ludwig | |
| 5,444,981 A | 8/1995 | Kakovitch | |
| 5,476,525 A | 12/1995 | Bekedam | |
| 5,577,881 A | 11/1996 | Hablanian | |
| 5,622,055 A | 4/1997 | Mei et al. | |
| 5,644,911 A | 7/1997 | Huber | |
| 5,727,393 A | 3/1998 | Mahmoudzadeh | |
| 5,832,728 A | 11/1998 | Buck | |
| 6,032,467 A | 3/2000 | Oshita et al. | |
| 6,141,955 A | 11/2000 | Akiyama et al. | |
| 6,145,295 A | 11/2000 | Donovan et al. | |
| 6,250,105 B1 | 6/2001 | Kimble | |
| 6,413,484 B1 | 7/2002 | Koch | |
| 6,490,865 B2 | 12/2002 | Pauly | |
| 6,769,256 B1 | 8/2004 | Kalina | |
| 6,884,021 B2 | 4/2005 | Saito | |
| 7,010,920 B2 | 3/2006 | Saranchuk et al. | |
| 7,096,665 B2 | 8/2006 | Stinger et al. | |
| 7,600,961 B2 | 10/2009 | Abdallah | |
| 7,806,649 B2 | 10/2010 | Ishikawa et al. | |
| 7,935,180 B2 | 5/2011 | Weber | |
| 8,176,724 B2 | 5/2012 | Smith | |
| 8,262,339 B2 | 9/2012 | Chien | |
| 8,631,658 B2 | 1/2014 | MacAdam et al. | |
| 8,726,635 B1 | 5/2014 | Dale | |
| 9,297,387 B2 * | 3/2016 | Palmer | F04D 17/122 |
| 9,303,514 B2 * | 4/2016 | Palmer | F01D 1/12 |
| 2002/0162330 A1 | 11/2002 | Shimizu et al. | |
| 2004/0123609 A1 | 7/2004 | Gottlieb | |
| 2004/0182082 A1 | 9/2004 | Saranchuk et al. | |
| 2005/0132713 A1 | 6/2005 | Neary | |
| 2009/0241860 A1 | 10/2009 | Monacelli et al. | |
| 2010/0019590 A1 * | 1/2010 | Guedes-Pinto | H02K 1/02 310/53 |
| 2010/0043433 A1 | 2/2010 | Kelly | |
| 2010/0051441 A1 | 3/2010 | Vane et al. | |
| 2010/0055010 A1 | 3/2010 | Froderberg et al. | |
| 2010/0071368 A1 | 3/2010 | Kaplan et al. | |
| 2010/0077752 A1 | 4/2010 | Papile | |
| 2010/0242476 A1 | 9/2010 | Ast et al. | |
| 2011/0000205 A1 | 1/2011 | Hauer et al. | |
| 2011/0209474 A1 | 9/2011 | Leibowitz | |
| 2011/0239700 A1 | 10/2011 | Hasse et al. | |
| 2012/0139470 A1 | 6/2012 | Huff et al. | |
| 2012/0151950 A1 | 6/2012 | Jagusztyn | |
| 2012/0255304 A1 | 10/2012 | Li et al. | |

FOREIGN PATENT DOCUMENTS

| | | |
|---|---|---|
| DE | 10227709 A1 | 2/2003 |
| JP | 2000282810 A | 10/2000 |
| JP | 2001-108201 A | 4/2001 |
| KR | 101045802 B1 | 7/2011 |
| WO | 02/073007 A2 | 9/2002 |
| WO | 2004/033859 A1 | 4/2004 |
| WO | 2006/028444 A1 | 3/2006 |
| WO | 2006/105815 A1 | 10/2006 |
| WO | 2012/076902 A1 | 6/2012 |
| WO | 2012151055 A2 | 11/2012 |
| WO | 2013/043999 A2 | 3/2013 |

OTHER PUBLICATIONS

International Search Report and Written Opinion issued on Oct. 9, 2013 in PCT/US2012/056524 to Harris Corporation (11 pages).
International Search Report and Written Opinion mailed Oct. 9, 2013 in International Application No. PCT/US2013/047750 (11 pages).
International Search Report and Written Opinion mailed Oct. 10, 2013 for International Patent Appln. No. PCT/US2013/0141506 to Harris Corporation (13 pages).
International Search Report and Written Opinion mailed Oct. 9, 2013 for International Patent Appln. No. PCT/US2013/051857 (11 pages).
Reference to U.S. Appl. No. 13/098,603, filed May 2, 2011.
Reference to U.S. Appl. No. 14/138,903, filed Dec. 23, 2013.
Reference to U.S. Appl. No. 14/139,094, filed Dec. 23, 2013.
Reference to U.S. Appl. No. 13/859,355, filed Apr. 9, 2013.
Reference to U.S. Appl. No. 13/859,409, filed Apr. 9, 2013.
Reference to U.S. Appl. No. 13/533,497, filed Jun. 26, 2012.
Reference to U.S. Appl. No. 13/239,674, filed Sep. 22, 2011.
Reference to U.S. Appl. No. 13/477,394, filed May 22, 2012.
Reference to U.S. Appl. No. 13/556,387, filed Jul. 24, 2012.
International Preliminary Report on Patentability mailed Dec. 4, 2014 for International Patent Appln. No. PCT/US2013/0141506 to Harris Corporation.
International Preliminary Report on Patentability mailed Jan. 8, 2015 for International Patent Appln. No. PCT/US2013/047750 to Harris Corporation.
International Preliminary Report on Patentability mailed Feb. 5, 2015 for International Patent Appln. No. PCT/US2013/051857 to Harris Corporation.
Information about Related Patents and Patent Applications, see section 6 of the accompanying Information Disclosure Statement Letter, which concerns Related Patents and Patent Applications.
International Search Report and Written Opinion mailed Nov. 16, 2012; Application No. PCT/US2012/034199 in the name of Harris Corporation.
U.S. Appl. No. 13/859,106, filed Apr. 9, 2013, System and Method of Wrapping Flow in a Fluid Working Apparatus.

* cited by examiner

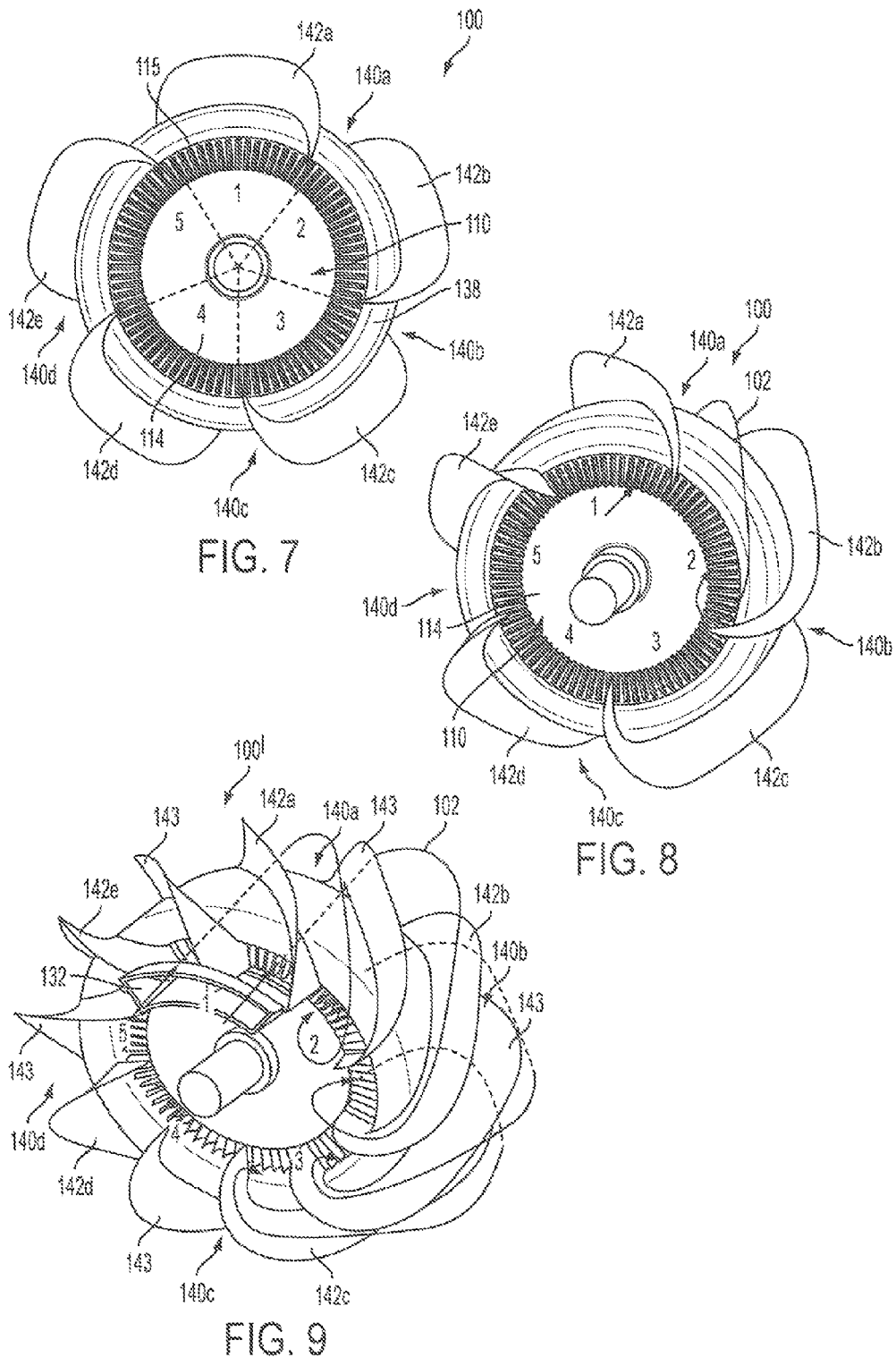

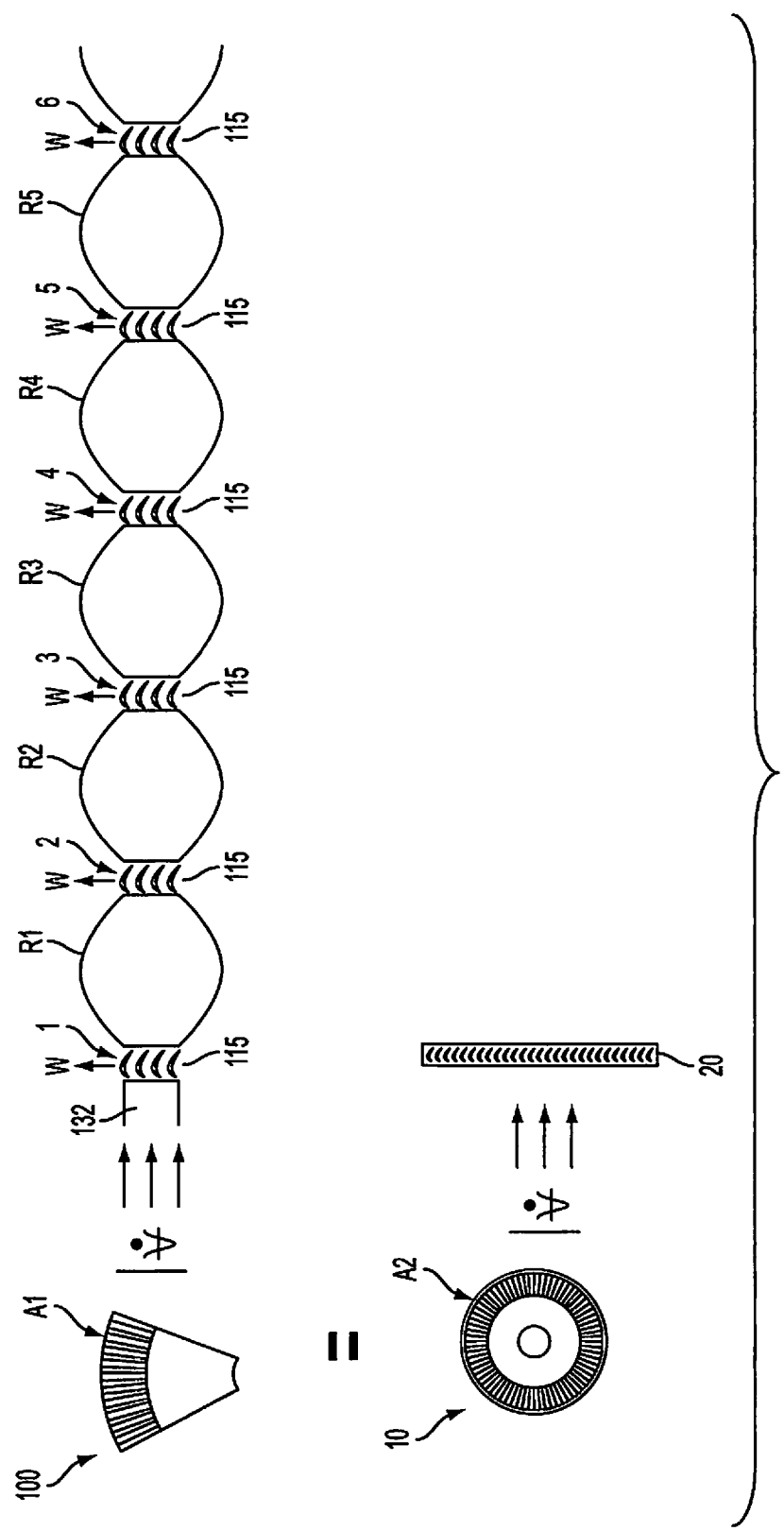

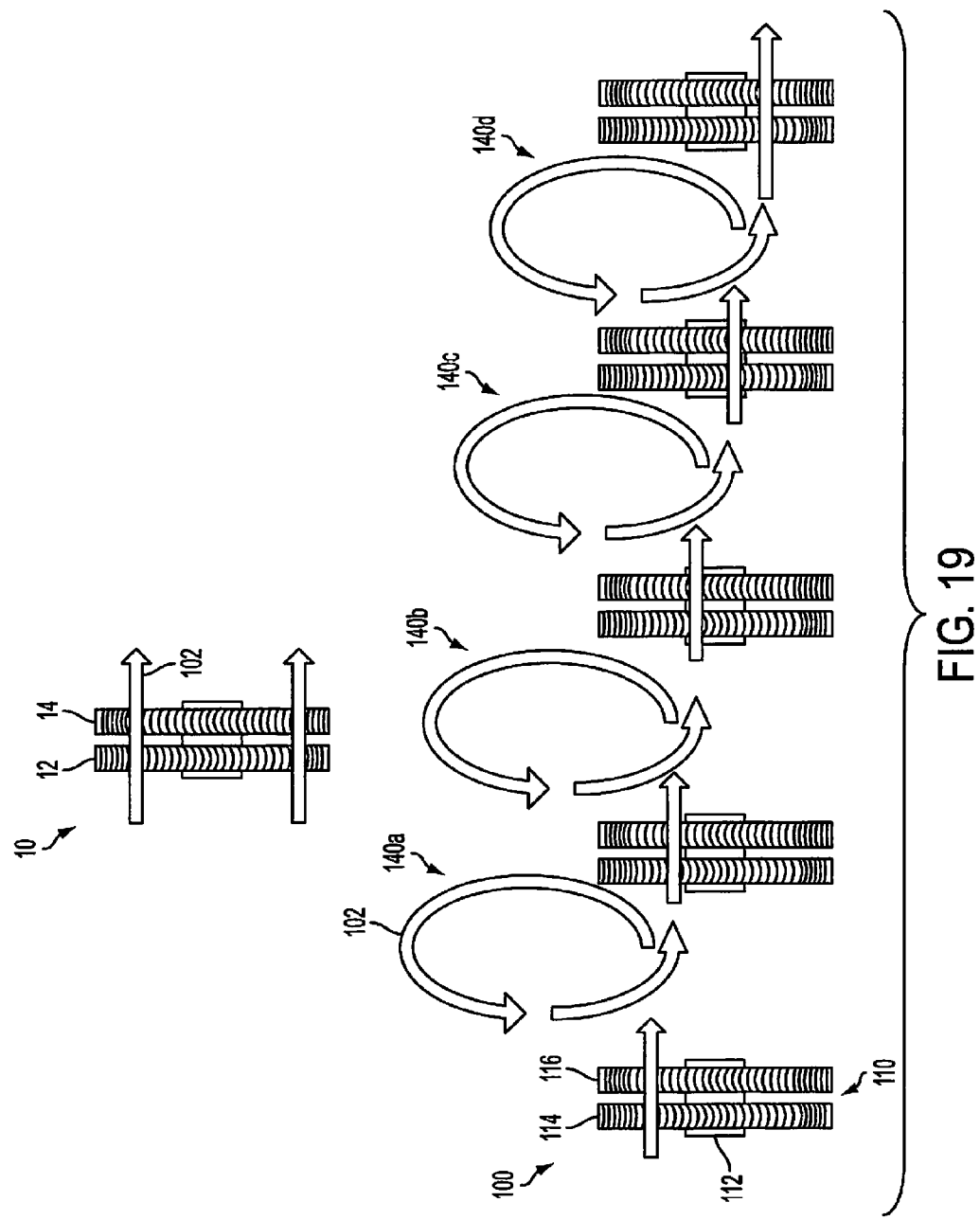

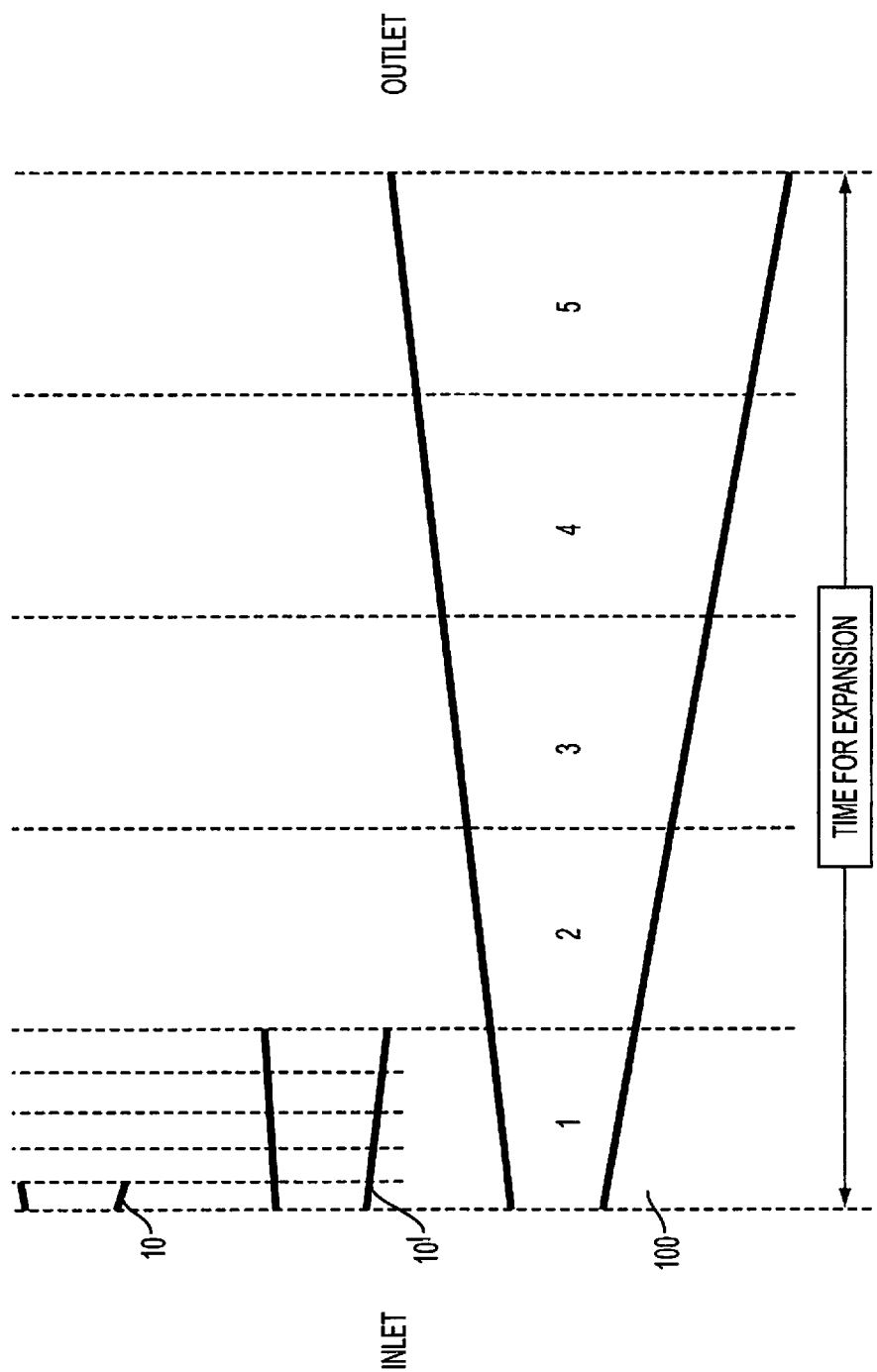

INLET NOZZLE

| FLUID # | FLUID 1 | FLUID 2 | FLUID 3 | FLUID 4 | UNITS |
|---|---|---|---|---|---|
| FLUID TYPE | N2 | METHANOL | METHANOL | | |
| STATE | VAPOR | VAPOR | LIQUID | | |
| MASS FLOW | 5.00 | 6.00 | 0.00 | | lbm/s |
| VOLUME IN | 4.10 | 3.25 | 0.00 | | ft3/lbm |
| ENERGY (h) IN | | 4053 | | | kW |
| TIN | | 235 | | | F |
| PIN | | 65 | | | psia |
| MASS FLOW IN | | 11.0 | | | lbm/s |
| CFM IN | | 2400 | | | ft3/min |
| VELOCITY IN | | 101 | | | mph |
| DENSITY (p) IN | | 0.27 | | | lbm/ft3 |
| VAPOR QUALITY | | 100% | | | |
| FLUID # | FLUID 1 | FLUID 2 | FLUID 3 | | |
| FLUID TYPE | N2 | METHANOL | METHANOL | | |
| STATE | VAPOR | VAPOR | LIQUID | | |
| MASS FLOW | 5.00 | 6.00 | 0.00 | | lbm/s |
| VOLUME OUT | 4.74 | 3.76 | 0.00 | | ft3/lbm |
| ENERGY (h) OUT | | 3995 | | | kW |
| TOUT | | 220 | | | F |
| POUT | | 55 | | | psia |
| MASS FLOW OUT | | 11.0 | | | lbm/s |
| CFM OUT | | 2777 | | | ft3/min |
| DENSITY (p) OUT | | 0.24 | | | lbm/ft3 |
| VAPOR QUALITY | | 100.0 | | | % |
| ENTROPY | | 12.39 | | | BTU/R |

STAGE 1

| FLUID # | FLUID 1 | FLUID 2 | FLUID 3 | FLUID 4 | UNITS |
|---|---|---|---|---|---|
| FLUID TYPE | N2 | METHANOL | METHANOL | | |
| STATE | VAPOR | VAPOR | LIQUID | | |
| MASS FLOW | 5.00 | 6.00 | 0.00 | | lbm/s |
| VOLUME IN | 4.74 | 3.76 | 0.00 | | ft3/lbm |
| ENERGY (h) IN | | 3995 | | | kW |
| TIN | | 220 | | | F |
| PIN | | 55 | | | psia |
| MASS FLOW IN | | 11.0 | | | lbm/s |
| CFM IN | | 2777 | | | ft3/min |
| VELOCITY IN | | 349 | | | mph |
| DENSITY (p) IN | | 0.24 | | | lbm/ft3 |
| VAPOR QUALITY % | | 100.0 | | | |
| FLUID # | FLUID 1 | FLUID 2 | FLUID 3 | | |
| FLUID TYPE | N2 | METHANOL | METHANOL | | |
| STATE | VAPOR | VAPOR | LIQUID | | |
| MASS FLOW | 5.00 | 5.99 | 0.01 | | lbm/s |
| VOLUME OUT | 5.43 | 4.31 | 0.02 | | ft3/lbm |
| ENERGY (h) OUT | | 3931 | | | kW |
| TOUT | | 207 | | | F |
| POUT | | 47 | | | psia |
| MASS FLOW OUT | | 11.0 | | | lbm/s |
| CFM OUT | | 3179 | | | ft3/min |
| DENSITY (p) OUT | | 0.21 | | | lbm/ft3 |
| VAPOR QUALITY % | | 99.8 | | | % |
| ANGULAR VELOCITY | | 2470 | | | rpm |
| TORQUE | | 4640 | | | ft-lbs |
| WORK | | 68 | | | kW |
| ACTIVE BLADES | | 8.50 | | | |
| ANGULAR DISP. | | 5.79 | | | DEG |
| ENTROPY | | 12.38 | | | BTU/R |

STAGE 2

| FLUID # | FLUID 1 | FLUID 2 | FLUID 3 | FLUID 4 | UNITS |
|---|---|---|---|---|---|
| FLUID TYPE | N2 | METHANOL | METHANOL | | |
| STATE | VAPOR | VAPOR | LIQUID | | |
| MASS FLOW | 5.00 | 5.99 | 0.01 | | lbm/s |
| VOLUME IN | 5.43 | 4.31 | 0.02 | | ft3/lbm |
| ENERGY (h) IN | | 3931 | | | kW |
| TIN | | 207 | | | F |
| PIN | | 47 | | | psia |
| MASS FLOW IN | | 11.00 | | | lbm/s |
| CFM IN | | 3179 | | | ft3/min |
| VELOCITY IN | | 349 | | | mph |
| DENSITY (p) IN | | 0.21 | | | lbm/ft3 |
| VAPOR QUALITY % | | 99.8 | | | |
| FLUID # | FLUID 1 | FLUID 2 | FLUID 3 | | |
| FLUID TYPE | N2 | METHANOL | METHANOL | | |
| STATE | VAPOR | VAPOR | LIQUID | | |
| MASS FLOW | 5.00 | 5.85 | 0.15 | | lbm/s |
| VOLUME OUT | 6.44 | 5.16 | 0.02 | | ft3/lbm |
| ENERGY (h) OUT | | 3841 | | | kW |
| TOUT | | 197 | | | F |
| POUT | | 39 | | | psia |
| MASS FLOW OUT | | 11.0 | | | lbm/s |
| CFM OUT | | 3743 | | | ft3/min |
| DENSITY (p) OUT | | 0.18 | | | lbm/ft3 |
| VAPOR QUALITY % | | 97.4 | | | % |
| ANGULAR VELOCITY | | 2468 | | | rpm |
| TORQUE | | 4637 | | | ft-lbs |
| WORK | | 68 | | | kW |
| ACTIVE BLADES | | 9.74 | | | |
| ANGULAR DISP. | | 5.79 | | | DEG |
| ENTROPY | | 12.41 | | | BTU/R |

| | STAGE 3 | | | | | | STAGE 4 | | | | | | STAGE 5 | | | | |
|---|---|---|---|---|---|---|---|---|---|---|---|---|---|---|---|---|---|
| | FLUID 1 | FLUID 2 | FLUID 3 | FLUID 4 | UNITS | | FLUID 1 | FLUID 2 | FLUID 3 | FLUID 4 | UNITS | | FLUID 1 | FLUID 2 | FLUID 3 | FLUID 4 | UNITS |
| FLUID # | | | | | | FLUID # | | | | | | FLUID # | | | | | |
| FLUID TYPE | N2 | METHANOL | METHANOL | | | FLUID TYPE | N2 | METHANOL | METHANOL | | | FLUID TYPE | N2 | METHANOL | METHANOL | | |
| STATE | VAPOR | VAPOR | LIQUID | | | STATE | VAPOR | VAPOR | LIQUID | | | STATE | VAPOR | VAPOR | LIQUID | | |
| MASS FLOW | 5.00 | 5.65 | 0.15 | | lbm/s | MASS FLOW | 5.00 | 5.72 | 0.28 | | lbm/s | MASS FLOW | 5.00 | 5.60 | 0.40 | | lbm/s |
| VOLUME IN | 6.44 | 5.16 | 0.02 | | ft3/lbm | VOLUME IN | 7.95 | 6.43 | 0.02 | | ft3/lbm | VOLUME IN | 10.44 | 6.54 | 0.02 | | ft3/lbm |
| ENERGY (h) IN | | 3641 | | | kW | ENERGY (h) IN | | 3749 | | | kW | ENERGY (h) IN | | 3652 | | | kW |
| TIN | | 197 | | | F | TIN | | 185 | | | F | TIN | | 170 | | | F |
| PIN | | 39 | | | psia | PIN | | 31 | | | psia | PIN | | 23 | | | psia |
| MASS FLOW IN | | 11.00 | | | lbm/s | MASS FLOW IN | | 11.00 | | | lbm/s | MASS FLOW IN | | 11.00 | | | lbm/s |
| CFM IN | | 3743 | | | ft3/min | CFM IN | | 4589 | | | ft3/min | CFM IN | | 6082 | | | ft3/min |
| VELOCITY IN | | 347 | | | mph | VELOCITY IN | | 351 | | | mph | VELOCITY IN | | 359 | | | mph |
| DENSITY (p) IN | | 0.18 | | | lbm/ft3 | DENSITY (p) IN | | 0.14 | | | lbm/ft3 | DENSITY (p) IN | | 0.11 | | | lbm/ft3 |
| VAPOR QUALITY % | | 97.4 | | | | VAPOR QUALITY % | | 95.3 | | | | VAPOR QUALITY % | | 93.3 | | | |
| FLUID # | FLUID 1 | FLUID 2 | FLUID 3 | | | FLUID # | FLUID 1 | FLUID 2 | FLUID 3 | | | FLUID # | FLUID 1 | FLUID 2 | FLUID 3 | | |
| FLUID TYPE | N2 | METHANOL | METHANOL | | | FLUID TYPE | N2 | METHANOL | METHANOL | | | FLUID TYPE | N2 | METHANOL | METHANOL | | |
| STATE | VAPOR | VAPOR | LIQUID | | | STATE | VAPOR | VAPOR | LIQUID | | | STATE | VAPOR | VAPOR | LIQUID | | |
| MASS FLOW | 5.00 | 5.72 | 0.28 | | lbm/s | MASS FLOW | 5.00 | 5.60 | 0.40 | | lbm/s | MASS FLOW | 5.00 | 5.50 | 0.50 | | lbm/s |
| VOLUME OUT | 7.95 | 6.43 | 0.02 | | ft3/lbm | VOLUME OUT | 10.44 | 8.54 | 0.02 | | ft3/lbm | VOLUME OUT | 15.45 | 12.79 | 0.02 | | ft3/lbm |
| ENERGY (h) OUT | | 3749 | | | kW | ENERGY (h) OUT | | 3652 | | | kW | ENERGY (h) OUT | | 3546 | | | kW |
| TOUT | | 185 | | | F | TOUT | | 170 | | | F | TOUT | | 149 | | | F |
| POUT | | 31 | | | psia | POUT | | 23 | | | psia | POUT | | 15 | | | psia |
| MASS FLOW OUT | | 11.0 | | | lbm/s | MASS FLOW OUT | | 11.0 | | | lbm/s | MASS FLOW OUT | | 11.0 | | | lbm/s |
| CFM OUT | | 4589 | | | ft3/min | CFM OUT | | 6082 | | | ft3/min | CFM OUT | | 8856 | | | ft3/min |
| DENSITY (p) OUT | | 0.14 | | | lbm/ft3 | DENSITY (p) OUT | | 0.11 | | | lbm/ft3 | DENSITY (p) OUT | | 0.07 | | | lbm/ft3 |
| VAPOR QUALITY % | | 95.3 | | | | VAPOR QUALITY % | | 93.3 | | | | VAPOR QUALITY % | | 91.7 | | | |
| ANGULAR VELOCITY | | 2459 | | | rpm | ANGULAR VELOCITY | | 2460 | | | rpm | ANGULAR VELOCITY | | 2538 | | | rpm |
| TORQUE | | 4619 | | | ft-lbs | TORQUE | | 4660 | | | ft-lbs | TORQUE | | 4757 | | | ft-lbs |
| WORK | | 67 | | | kW | WORK | | 68 | | | kW | WORK | | 72 | | | kW |
| ACTIVE BLADES | | 11.51 | | | | ACTIVE BLADES | | 13.99 | | | | ACTIVE BLADES | | 17.88 | | | |
| ANGULAR DISP. | | 5.79 | | | DEG | ANGULAR DISP. | | 5.79 | | | DEG | ANGULAR DISP. | | 5.79 | | | DEG |
| ENTROPY | | 12.46 | | | BTU/R | ENTROPY | | 12,590 | | | BTU/R | ENTROPY | | 12,592 | | | BTU/R |

| | INLET NOZZLE | | | | |
|---|---|---|---|---|---|
| FLUID # | FLUID 1 | FLUID 2 | FLUID 3 | FLUID 4 | UNITS |
| FLUID TYPE | N2 | METHANOL | METHANOL | | |
| STATE | VAPOR | VAPOR | LIQUID | | |
| MASS FLOW | 5.00 | 6.00 | 0.00 | | lbm/s |
| VOLUME IN | 4.10 | 3.25 | 0.00 | | ft3/lbm |
| ENERGY (h) IN | | 4053 | | | kW |
| TIN | | 235 | | | F |
| PIN | | 65 | | | psia |
| MASS FLOW IN | | 11.0 | | | lbm/s |
| CFM IN | | 2400 | | | ft3/min |
| VELOCITY IN | | 105 | | | mph |
| DENSITY (p) IN | | 0.27 | | | lbm/ft3 |
| VAPOR QUALITY | | 100% | | | |
| FLUID # | FLUID 1 | FLUID 2 | FLUID 3 | | |
| FLUID TYPE | N2 | METHANOL | METHANOL | | |
| STATE | VAPOR | VAPOR | LIQUID | | |
| MASS FLOW | 5.00 | 6.00 | 0.00 | | lbm/s |
| VOLUME OUT | 4.74 | 3.76 | 0.00 | | ft3/lbm |
| ENERGY (h) OUT | | 3995 | | | kW |
| TOUT | | 220 | | | F |
| POUT | | 55 | | | psia |
| MASS FLOW OUT | | 11.0 | | | lbm/s |
| CFM OUT | | 2777 | | | ft3/min |
| DENSITY (p) OUT | | 0.24 | | | lbm/ft3 |

| | STAGE 1 | | | | |
|---|---|---|---|---|---|
| FLUID # | FLUID 1 | FLUID 2 | FLUID 3 | FLUID 4 | UNITS |
| FLUID TYPE | N2 | METHANOL | METHANOL | | |
| STATE | VAPOR | VAPOR | LIQUID | | |
| MASS FLOW | 5.00 | 6.00 | 0.00 | | lbm/s |
| VOLUME IN | 4.74 | 3.76 | 0.00 | | ft3/lbm |
| ENERGY (h) IN | | 3995 | | | kW |
| TIN | | 220 | | | F |
| PIN | | 55 | | | psia |
| MASS FLOW IN | | 11.0 | | | lbm/s |
| CFM IN | | 2777 | | | ft3/min |
| VELOCITY IN | | 363 | | | mph |
| DENSITY (p) IN | | 0.24 | | | lbm/ft3 |
| VAPOR QUALITY % | | 100.0 | | | |
| FLUID # | FLUID 1 | FLUID 2 | FLUID 3 | | |
| FLUID TYPE | N2 | METHANOL | METHANOL | | |
| STATE | VAPOR | VAPOR | LIQUID | | |
| MASS FLOW | 5.00 | 5.99 | 0.01 | | lbm/s |
| VOLUME OUT | 5.43 | 4.31 | 0.02 | | ft3/lbm |
| ENERGY (h) OUT | | 3931 | | | kW |
| TOUT | | 207 | | | F |
| POUT | | 47 | | | psia |
| MASS FLOW OUT | | 11.0 | | | lbm/s |
| CFM OUT | | 3179 | | | ft3/min |
| DENSITY (p) OUT | | 0.21 | | | lbm/ft3 |
| VAPOR QUALITY % | | 99.8 | | | |
| ANGULAR VELOCITY | | 9148 | | | rpm |
| TORQUE | | 819 | | | ft-lbs |
| WORK | | 4 | | | kW |
| ACTIVE BLADES | | 31.53 | | | |
| ANGULAR DISP. | | 6.02 | | | DEG |

| | STAGE 2 | | | | |
|---|---|---|---|---|---|
| FLUID # | FLUID 1 | FLUID 2 | FLUID 3 | FLUID 4 | UNITS |
| FLUID TYPE | N2 | METHANOL | METHANOL | | |
| STATE | VAPOR | VAPOR | LIQUID | | |
| MASS FLOW | 5.00 | 5.99 | 0.01 | | lbm/s |
| VOLUME IN | 5.43 | 4.31 | 0.02 | | ft3/lbm |
| ENERGY (h) IN | | 3931 | | | kW |
| TIN | | 207 | | | F |
| PIN | | 47 | | | psia |
| MASS FLOW IN | | 11.00 | | | lbm/s |
| CFM IN | | 3179 | | | ft3/min |
| VELOCITY IN | | 363 | | | mph |
| DENSITY (p) IN | | 0.21 | | | lbm/ft3 |
| VAPOR QUALITY % | | 99.8 | | | |
| FLUID # | FLUID 1 | FLUID 2 | FLUID 3 | | |
| FLUID TYPE | N2 | METHANOL | METHANOL | | |
| STATE | VAPOR | VAPOR | LIQUID | | |
| MASS FLOW | 5.00 | 5.85 | 0.15 | | lbm/s |
| VOLUME OUT | 6.44 | 5.16 | 0.02 | | ft3/lbm |
| ENERGY (h) OUT | | 3841 | | | kW |
| TOUT | | 197 | | | F |
| POUT | | 39 | | | psia |
| MASS FLOW OUT | | 11.0 | | | lbm/s |
| CFM OUT | | 3743 | | | ft3/min |
| DENSITY (p) OUT | | 0.18 | | | lbm/ft3 |
| VAPOR QUALITY % | | 97.4 | | | |
| ANGULAR VELOCITY | | 8651 | | | rpm |
| TORQUE | | 938 | | | ft-lbs |
| WORK | | 48 | | | kW |
| ACTIVE BLADES | | 32.02 | | | |
| ANGULAR DISP. | | 6.79 | | | DEG |

| | STAGE 3 | | | | |
|---|---|---|---|---|---|
| FLUID # | FLUID 1 | FLUID 2 | FLUID 3 | FLUID 4 | UNITS |
| FLUID TYPE | N2 | METHANOL | METHANOL | | |
| STATE | VAPOR | VAPOR | LIQUID | | |
| MASS FLOW | 5.00 | 5.85 | 0.15 | | lbm/s |
| VOLUME IN | 6.44 | 5.16 | 0.02 | | ft3/lbm |
| ENERGY (b) IN | | 3841 | | | kW |
| TIN | | 197 | | | F |
| PIN | | 39 | | | psia |
| MASS FLOW IN | | 11.00 | | | lbm/s |
| CFM IN | | 3743 | | | ft3/min |
| VELOCITY IN | | 342 | | | mph |
| DENSITY (b) IN | | 0.18 | | | lbm/ft3 |
| VAPOR QUALITY % | | 97.4 | | | |

| FLUID # | FLUID 1 | FLUID 2 | FLUID 3 | FLUID 4 | UNITS |
|---|---|---|---|---|---|
| FLUID TYPE | N2 | METHANOL | METHANOL | | |
| STATE | VAPOR | VAPOR | LIQUID | | |
| MASS FLOW | 5.00 | 5.72 | 0.28 | | lbm/s |
| VOLUME OUT | 7.95 | 6.43 | 0.02 | | ft3/lbm |
| ENERGY (b) OUT | | 3749 | | | kW |
| TOUT | | 185 | | | F |
| POUT | | 31 | | | psia |
| MASS FLOW OUT | | 11.0 | | | lbm/s |
| CFM OUT | | 4569 | | | ft3/min |
| DENSITY (b) OUT | | 0.14 | | | lbm/ft3 |
| VAPOR QUALITY % | | 95.3 | | | |
| ANGULAR VELOCITY | | 8085 | | | rpm |
| TORQUE | | 1104 | | | ft-lbs |
| WORK | | 53 | | | kW |
| ACTIVE BLADES | | 32.68 | | | |
| ANGULAR DISP. | | 7.76 | | | DEG |

| | STAGE 4 | | | | |
|---|---|---|---|---|---|
| FLUID # | FLUID 1 | FLUID 2 | FLUID 3 | FLUID 4 | UNITS |
| FLUID TYPE | N2 | METHANOL | METHANOL | | |
| STATE | VAPOR | VAPOR | LIQUID | | |
| MASS FLOW | 5.00 | 5.72 | 0.28 | | lbm/s |
| VOLUME IN | 7.95 | 6.43 | 0.02 | | ft3/lbm |
| ENERGY (b) IN | | 3749 | | | kW |
| TIN | | 185 | | | F |
| PIN | | 31 | | | psia |
| MASS FLOW IN | | 11.00 | | | lbm/s |
| CFM IN | | 4569 | | | ft3/min |
| VELOCITY IN | | 340 | | | mph |
| DENSITY (b) IN | | 0.14 | | | lbm/ft3 |
| VAPOR QUALITY % | | 95.3 | | | |

| FLUID # | FLUID 1 | FLUID 2 | FLUID 3 | FLUID 4 | UNITS |
|---|---|---|---|---|---|
| FLUID TYPE | N2 | METHANOL | METHANOL | | |
| STATE | VAPOR | VAPOR | LIQUID | | |
| MASS FLOW | 5.00 | 5.60 | 0.40 | | lbm/s |
| VOLUME OUT | 10.44 | 8.54 | 0.02 | | ft3/lbm |
| ENERGY (b) OUT | | 3652 | | | kW |
| TOUT | | 170 | | | F |
| POUT | | 23 | | | psia |
| MASS FLOW OUT | | 11.0 | | | lbm/s |
| CFM OUT | | 6002 | | | ft3/min |
| DENSITY (b) OUT | | 0.11 | | | lbm/ft3 |
| VAPOR QUALITY % | | 93.3 | | | |
| ANGULAR VELOCITY | | 7679 | | | rpm |
| TORQUE | | 1353 | | | ft-lbs |
| WORK | | 62 | | | kW |
| ACTIVE BLADES | | 33.53 | | | |
| ANGULAR DISP. | | 8.95 | | | DEG |

| | STAGE 5 | | | | |
|---|---|---|---|---|---|
| FLUID # | FLUID 1 | FLUID 2 | FLUID 3 | FLUID 4 | UNITS |
| FLUID TYPE | N2 | METHANOL | METHANOL | | |
| STATE | VAPOR | VAPOR | LIQUID | | |
| MASS FLOW | 5.00 | 5.60 | 0.40 | | lbm/s |
| VOLUME IN | 10.44 | 8.54 | 0.02 | | ft3/lbm |
| ENERGY (b) IN | | 3652 | | | kW |
| TIN | | 170 | | | F |
| PIN | | 23 | | | psia |
| MASS FLOW IN | | 11.00 | | | lbm/s |
| CFM IN | | 6002 | | | ft3/min |
| VELOCITY IN | | 358 | | | mph |
| DENSITY (b) IN | | 0.11 | | | lbm/ft3 |
| VAPOR QUALITY % | | 93.3 | | | |

| FLUID # | FLUID 1 | FLUID 2 | FLUID 3 | FLUID 4 | UNITS |
|---|---|---|---|---|---|
| FLUID TYPE | N2 | METHANOL | METHANOL | | |
| STATE | VAPOR | VAPOR | LIQUID | | |
| MASS FLOW | 5.00 | 5.50 | 0.50 | | lbm/s |
| VOLUME OUT | 15.45 | 12.79 | 0.02 | | ft3/lbm |
| ENERGY (b) OUT | | 3546 | | | kW |
| TOUT | | 149 | | | F |
| POUT | | 15 | | | psia |
| MASS FLOW OUT | | 11.0 | | | lbm/s |
| CFM OUT | | 8856 | | | ft3/min |
| DENSITY (b) OUT | | 0.07 | | | lbm/ft3 |
| VAPOR QUALITY % | | 91.7 | | | |
| ANGULAR VELOCITY | | 7678 | | | rpm |
| TORQUE | | 1770 | | | ft-lbs |
| WORK | | 80 | | | kW |
| ACTIVE BLADES | | 34.56 | | | |
| ANGULAR DISP. | | 10.24 | | | DEG |

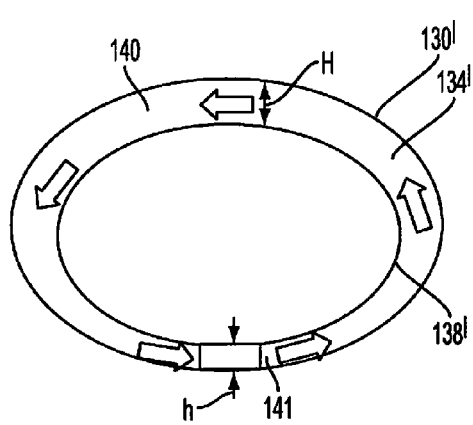 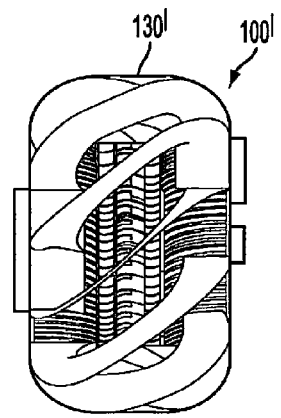
FIG. 34  FIG. 35
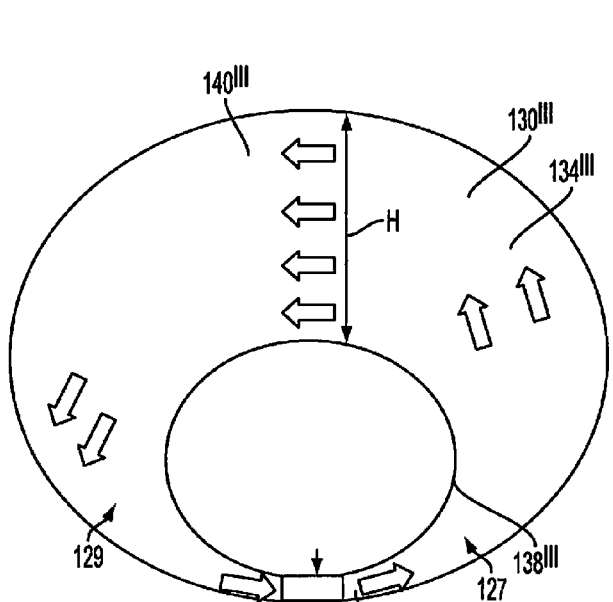 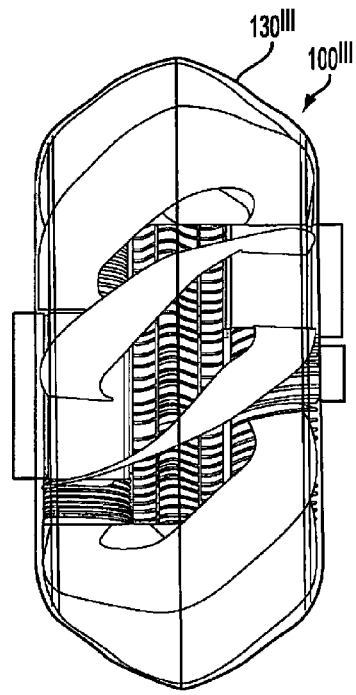
FIG. 36  FIG. 37

SYSTEM AND METHOD OF WRAPPING FLOW IN A FLUID WORKING APPARATUS

BACKGROUND OF THE INVENTION

Statement of the Technical Field

The invention concerns fluid working, and more particularly systems and methods for wrapping fluid flow in a fluid working apparatus, for example an expander or compressor, which results in an increased capacity to perform work by the fluid or on the fluid.

Description of the Related Art

A turbo-expander is a machine which continuously converts kinetic energy into mechanical energy by harnessing the pressure and heat of pressurized fluid to rotate a shaft. FIGS. 1 and 2 show an exemplary axial turbo-expander 10. Each stage of the expander 10 includes a rotatable rotor 12 and a stationary stator 14. Inlet vanes 16 and outlet vanes (not shown) may be provided to help guide the path of the flowing fluid and the vanes may serve as the stator for one or more of the stages. The rotors 12, stators 14 and vanes are supported in a housing 18. To ensure proper flow and rotation, each of the rotors 12 must be manufactured within tight tolerances relative to the housing 18. As illustrated by the arrows, the fluid passes through each stage a single time, interacting with the rotor 12 and stator 14 for only the period of time it takes for the fluid to pass through the stage. As the fluid passes through a given stage, the fluid expands and exerts a force to rotate the rotor 12, which in turn rotates the shaft (not shown).

Turbo-expanders are utilized in various applications, for example, a compressor-drive, power generator, brake drive, or cooling system. In the first three examples, the power transmitted to the shaft is used to drive a compressor, drive an electrical generator or is dissipated through an oil brake or air brake, respectively. In a cooling or refrigeration system, the gas exiting the expander, which is colder and lower-pressure than it was when it went in, is directed to a heat exchanger. Expanders and compressors may comprise or take on many different physical configurations, all of which are easily found in literature. The axial flow example shown provides the most useful architecture for the purpose of contrasting the difference. These applications are for illustrative purposes only and are not intended to be limiting.

An axial compressor works just like the turbo expander but in reverse. Power is supplied to the shaft which in turn rotates the rotors. The rotors accelerate the fluid and the stators diffuse the flow to obtain a pressure increase. That is, the diffusion in the stator converts the velocity increase gained in the rotor to a pressure increase. As with the expander, the fluid passes through each stage a single time, interacting with the rotor and stator for only the period of time it takes for the fluid to pass through the stage.

SUMMARY OF THE INVENTION

Embodiments of the invention concern a fluid working apparatus. In at least one embodiment, the fluid working apparatus includes a housing structure with a housing inlet and a housing outlet. A working assembly is positioned in the housing with a rotor thereof rotatably supported in the housing structure. The working assembly has an inlet side and an opposite outlet side with the at least one rotor having a plurality of blades positioned between the inlet and outlet sides. At least one return assembly is configured to return fluid flow from the outlet side of the working assembly to the inlet side of the working assembly whereby a working fluid passes through the housing inlet, then from the inlet side of the working assembly to the outlet side thereof while workingly engaging a first subset of the rotor blades, then through the at least one return assembly, then from the inlet side of the working assembly to the outlet side thereof while workingly engaging a second subset of the rotor blades, and thereafter out of the housing outlet.

Embodiments of the invention concern a method of re-circulating a working fluid. The method includes passing the fluid from an inlet side of a working assembly to an outlet side thereof, the working assembly including at least one rotor having a plurality of blades positioned between the inlet and outlet sides, whereby the fluid while workingly engages a first subset of the rotor blades; passing the fluid through a return assembly whereby the fluid flows from the outlet side of the working assembly to the inlet side of the working assembly; and passing the fluid from the inlet side of the working assembly to the outlet side thereof while workingly engaging a second subset of the rotor blades.

The present invention provides multi-pass recirculation of the working fluid that is unique relative to the current art.

BRIEF DESCRIPTION OF THE DRAWINGS

Embodiments will be described with reference to the following drawing figures, in which like numerals represent like items throughout the figures, and in which:

FIG. 7 is a front elevation view of the fluid working apparatus of FIG. 3 with the outer housing omitted.

FIG. 8 is an isometric view of the fluid working apparatus of FIG. 3 with the outer housing omitted.

FIG. 9 is an isometric view of the fluid working apparatus of FIG. 6 with the outer housing omitted.

FIG. 10 A is an expanded view of a portion of the fluid working apparatus of FIG. 10.

FIG. 18 is a drawing that is useful for understanding the flow volume and work output of an exemplary fluid working apparatus of the present invention relative to that of a prior art axial turbo-expander.

FIG. 19 is a drawing that is useful for understanding the flow path of an exemplary fluid working apparatus of the present invention relative to that of a prior art axial turbo-expander.

FIG. 20 is a drawing that is useful for understanding the time for expansion of an exemplary fluid working apparatus of the present invention relative to that of a prior art axial turbo-expander.

FIGS. 21A and 21B present a table showing measurements from an exemplary single rotor, five zone fluid working apparatus of the present invention.

FIGS. 25A and 25B present a table showing measurements from a prior art, five rotor axial turbo-expander as illustrated in FIG. 24.

FIG. 34 is a drawing illustrating fluid flow through the housing of the exemplary fluid working apparatus of FIG. 35.

FIG. 36 is a drawing illustrating fluid flow through the housing of the exemplary fluid working apparatus of FIG. 37.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Referring to FIGS. 3-14, fluid working apparatuses 100, 100' in accordance with exemplary embodiments of the present invention will be described. As used herein, the term fluid working apparatus refers to an apparatus with a rotatable rotor which works on a working fluid or is worked on by a working fluid. Examples include expanders and compressors, but are not limited to such.

Figure 10:
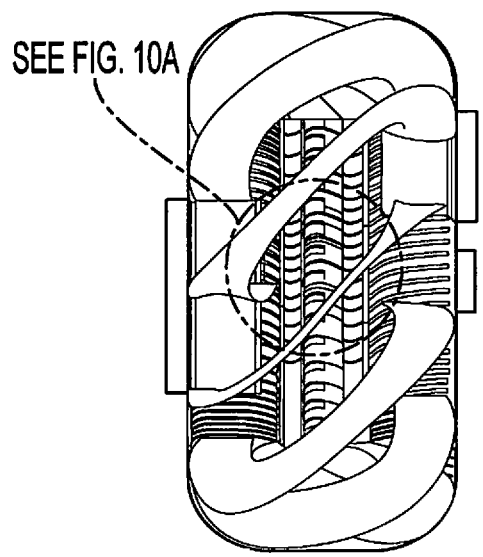
FIG. 10 is a top plan view of the fluid working apparatus of FIG. 6 with the outer housing shown transparently.
Figure 10A:
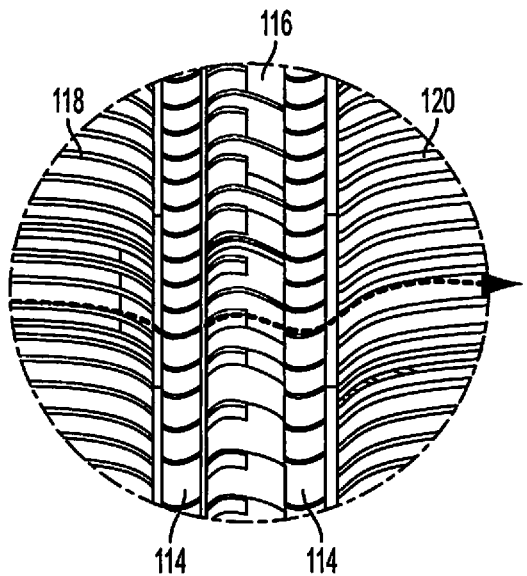

Each fluid working apparatus 100, 100' includes a working assembly 110 supported within a housing 130. The working assembly 110 includes a shaft 112 which supports at least one rotor 114 with a plurality of blades 115. In the present embodiments, the working assembly 110 includes a pair of rotors 114 with a stator 116 positioned therebetween. As shown in FIG. 10A, inlet vanes 118 and outlet vanes 120 may be provided to guide fluid flow across the rotors 114 and stator 116. The invention does not require 2 rotors, it could be accomplished with 1, 3, 4 or more depending on the specifics of the design application.

Figure 1:
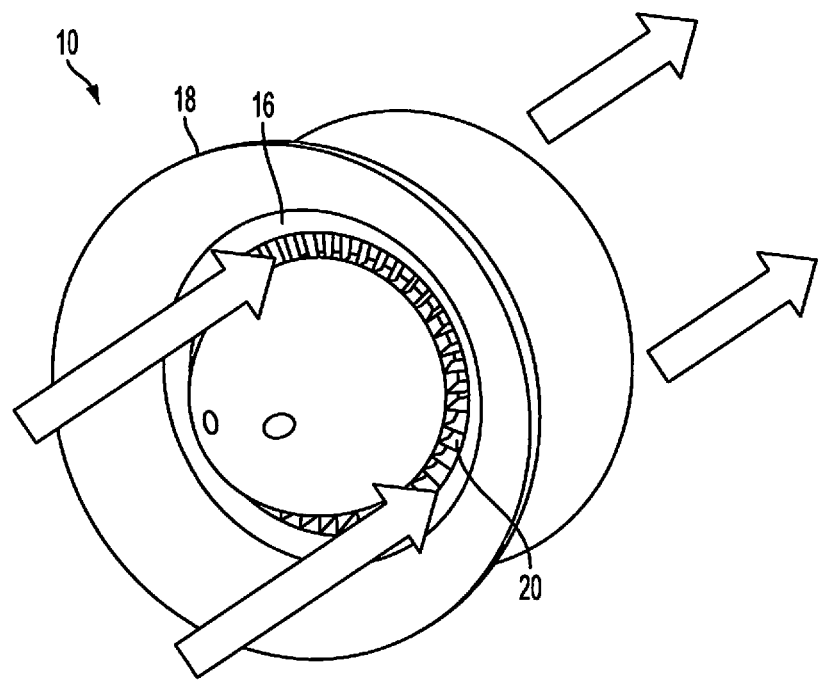
FIG. 1 is a front isometric view of an exemplary prior art axial turbo-expander.
Figure 2:
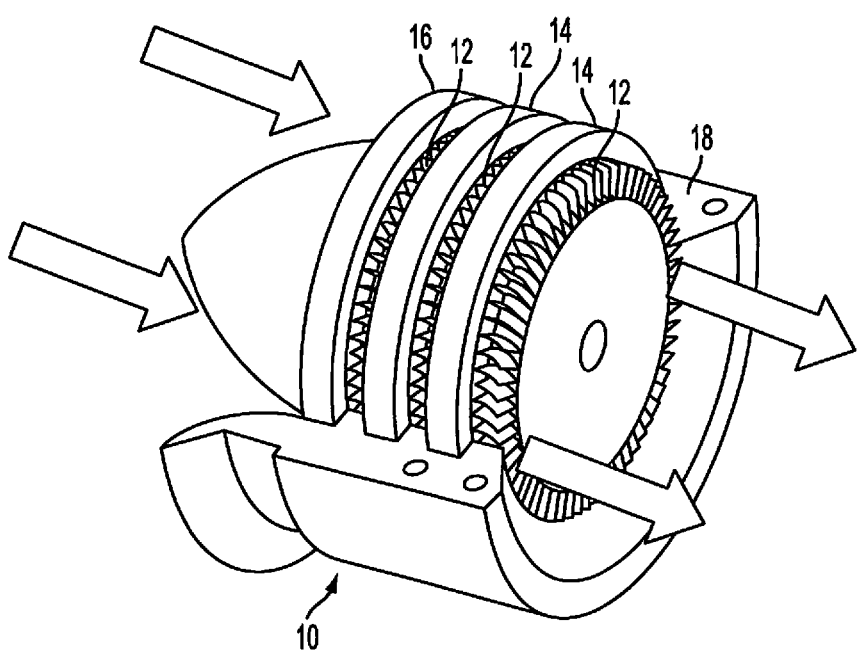
FIG. 2 is a rear isometric view of the axial turbo-expander of FIG. 1 in partial cutaway.
Figure 3:
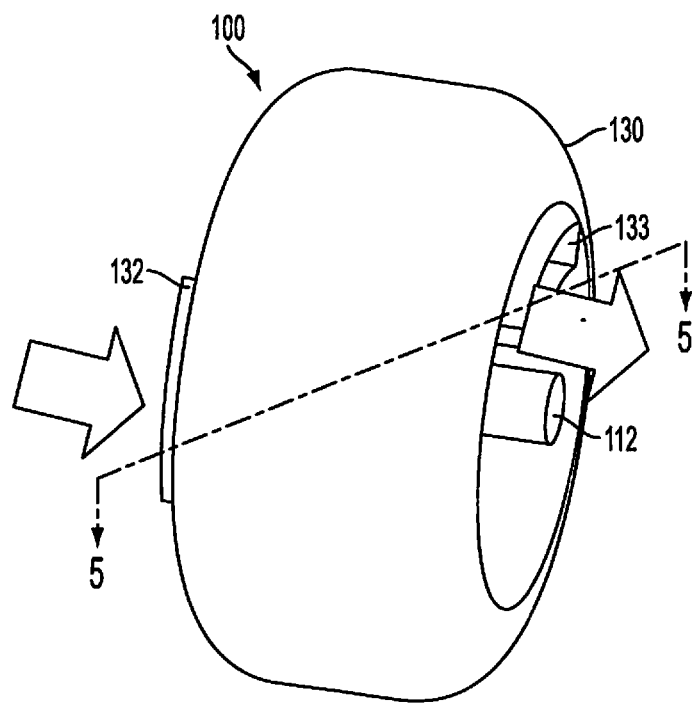
FIG. 3 is an isometric view of a fluid working apparatus in accordance with an exemplary embodiment of the present invention.
Figure 4:
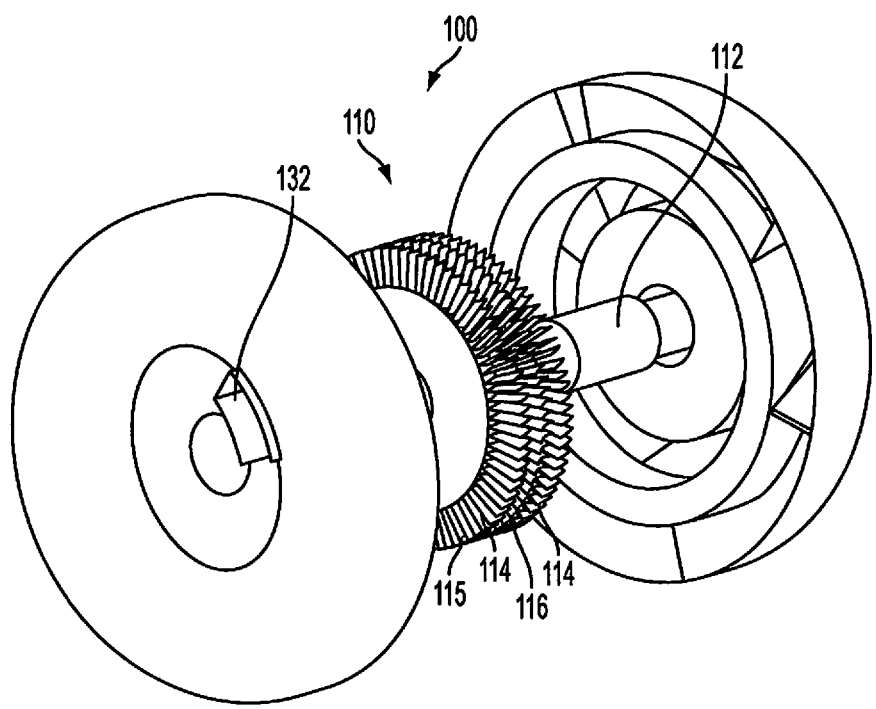
FIG. 4 is an exploded view of the fluid working apparatus of FIG. 3.
Figure 5:
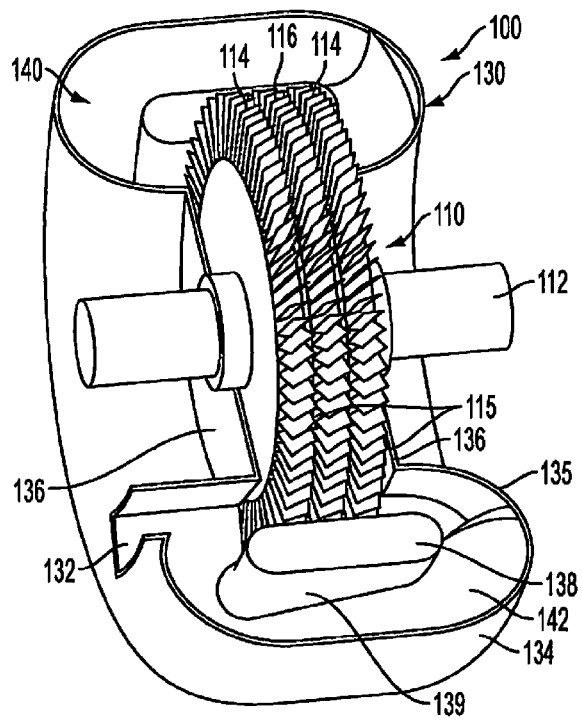
FIG. 5 is a cross-sectional view along the line 5-5 in FIG. 3.
Figure 6:
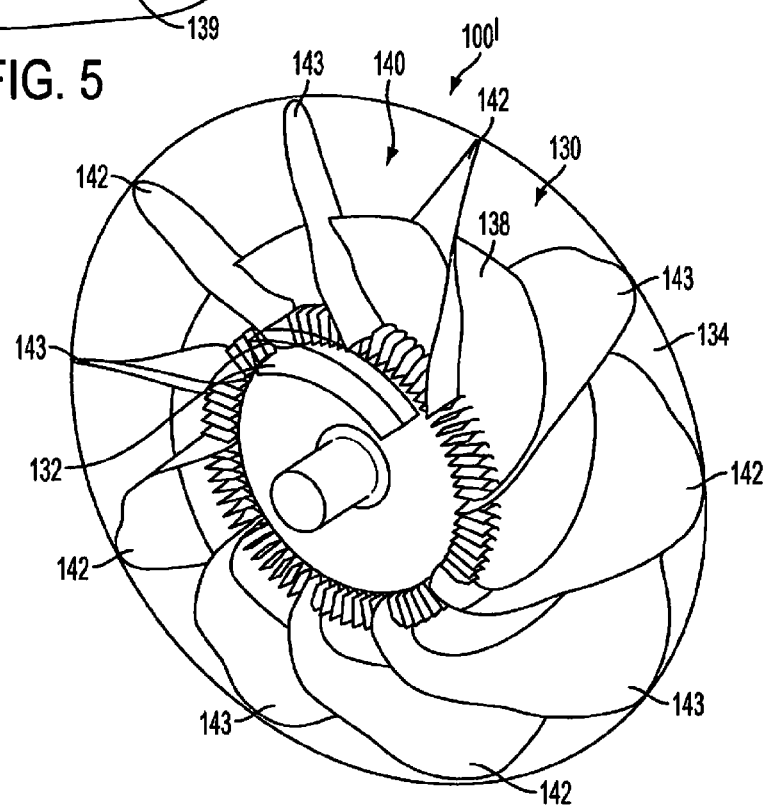
FIG. 6 is an isometric view of an exemplary fluid working apparatus with the outer housing shown transparently.

The housing 130, shown in FIG. 5, includes an outer housing member 134 and an inner housing member 138. The outer housing member 134 includes a hollow tubular portion 135 with side walls 136 extending within the center of the tubular portion 135. The side walls 136 support the shaft 112 with the rotors 114, stator 116 and the inlet and outlet vanes 118, 120 positioned therebetween. The stator 116 may be rotationally fixed through connection to the inner housing member 138 or otherwise. The rotors 114 and stator 116 extend radially into the tubular portion 135 of the outer housing member 134. A housing inlet 132 extends through one side of the outer housing member 134 aligned with the blades 115 of the rotors 114. As illustrated in FIGS. 4 and 6, the housing inlet 132 extends only a portion of the housing 130 circumference. A housing outlet 133 extends through the opposite side of the outer housing member 134 in alignment with the rotor blades 115. Similarly, the housing outlet 133 extends only a portion of the housing 130 circumference. As will be described hereinafter, the housing inlet 132 and outlet 133 may have the same or different circumferential widths. The surface of the working assembly 110 adjacent the inlet 132 may be referred to the inlet surface and the surface of the working assembly 110 adjacent the outlet 133 may be referred to as the outlet surface.

The inner housing member 138 is positioned within the tubular portion 135 of the outer housing 134 and has a tubular outer surface 139 spaced from the inside surface of the outer housing 134 such that a return chamber 140 is defined between the inner housing 138 and the outer housing 134. The inner housing member 138 is illustrated as a solid structure, but may instead be completely or partially hollow. The inner housing member 138 is maintained in position relative to the outer housing member 134 by a plurality of boundary vanes 142, alone or in conjunction with guide vanes 143, extending between the inner surface of the tubular portion 135 and the outer surface 139 of the inner housing member 138.

The boundary vanes 142 extend helically and divide the return chamber 140 into distinct return zones 140a, 140b, 140c, 140d as illustrated in FIGS. 7-9. For example, the boundary vanes 142a and 142b define the return zone 140a, vanes 142b and 142c define the return zone 140b, vanes 142c and 142d define the return zone 140c, and vanes 142d and 142e define the return zone 140d. The vanes 142, and thereby the return zones 140a-140d, extend from the outlet surface of the working assembly 110 to the inlet surface of the working assembly 110. Each return zone 140a-140d represents a return assembly. As illustrated in FIGS. 6 and 9, one or more guide vanes 143 may be positioned between the boundary vanes 142. The guide vanes 143 do not define a given return zone 140a-140d, but instead assist in guiding fluid as it travels through the given zone, for example by reducing turbulence.

The working fluid enters through the housing inlet 132 and passes through a first working zone 1 of the rotor blades 115. The working fluid acts on the rotors 114 as it passes through and then exits the rear of the working assembly 110 as shown in FIGS. 10 and 10A. Upon exiting, the working fluid is directed through the return zone 140a and back to the inlet surface of the working assembly 110 whereafter it passes through a second zone 2 of the rotor blades 115. The working fluid again acts on the rotors 114 as it passes through and then exits the rear of the working assembly 110. Upon exiting, the working fluid is directed through the return zone 140b and back to the inlet surface of the working assembly 110 whereafter it passes through a third zone 3 of the rotor blades 115. The working fluid again acts on the rotors 114 as it passes through and then exits the rear of the working assembly 110. Upon exiting, the working fluid is directed through the return zone 140c and back to the inlet surface of the working assembly 110 whereafter it passes through a fourth zone 4 of the rotor blades 115. The working fluid once again acts on the rotors 114 as it passes through and then exits the rear of the working assembly 110. Upon exiting, the working fluid is directed through the return zone 140d and back to the inlet surface of the working assembly 110 whereafter it passes through a fifth zone 5 of the rotor blades 115. The working fluid once again acts on the rotors 114 as it passes through and then exits the rear of the working assembly 110. The working fluid, after acting on the rotors 114 five times, then exits through the housing outlet 133. Each pass of the working fluid across a rotor 114 may be referenced as a stage. In the presently described embodiment, the working fluid passes across two rotors 114 five times, thereby achieving ten stages of potential work on the blades.

Figure 11:
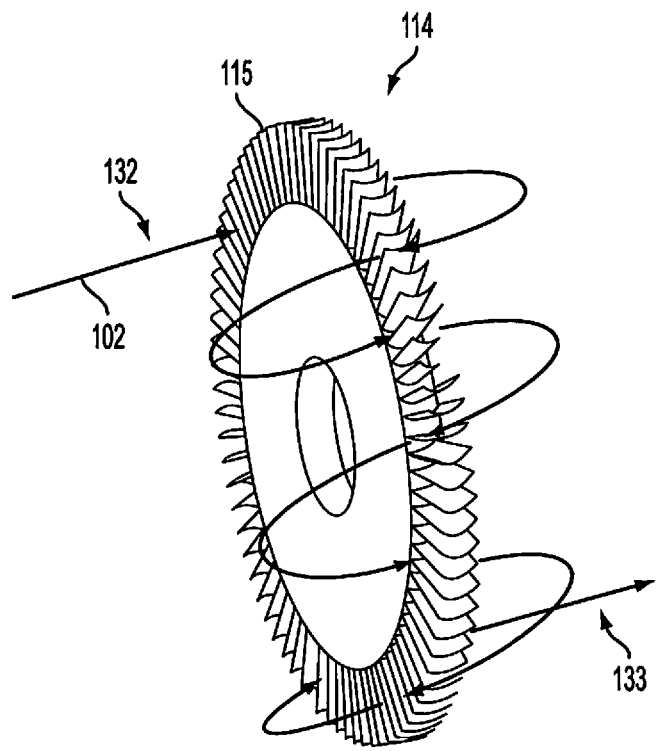
FIG. 11 is an isometric view of an exemplary rotor illustrating an exemplary flow path of a fluid working apparatus in accordance with the invention.
Figure 12:
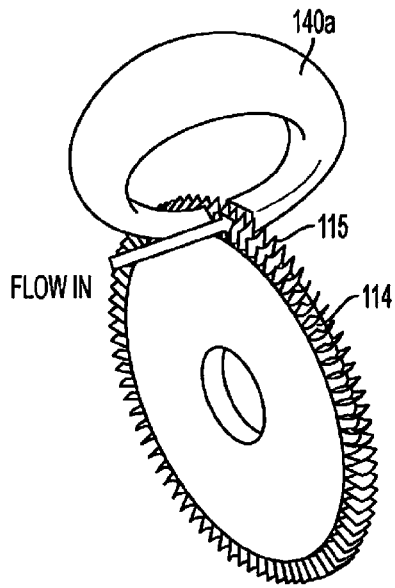
FIGS. 12-14 are drawings that are useful for understanding flow paths of the fluid in accordance with one or more embodiments of the invention.
Figure 13:
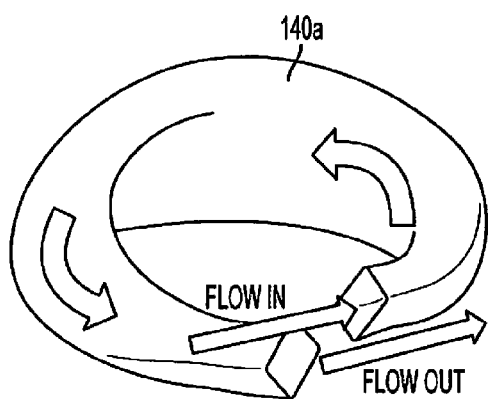
Figure 14:
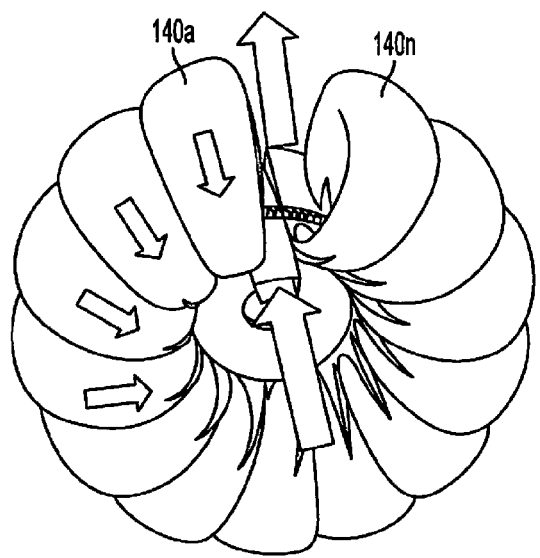

FIG. 11 illustrates an exemplary path 102 of the working fluid as it enters through the housing inlet 132 and passes the rotor blades 115 multiple times before exiting through the housing outlet 133. FIGS. 12-14 provide further simplified illustrations of the exemplary fluid flow. The return zones 140a or return assemblies are illustrated as independent tubular members, which is conceivable, however, the zones are preferably defined by the housing 130 and vanes 142 as described above. The flow in for a given blade zone passes the rotor 114 and then is returned through the return zone 140a. The entrance to the return zone 140a is circumferentially offset from the exit from the return zone 140a such that the flow out of the working fluid is delivered to the next zone of blades 115.

Figure 15:
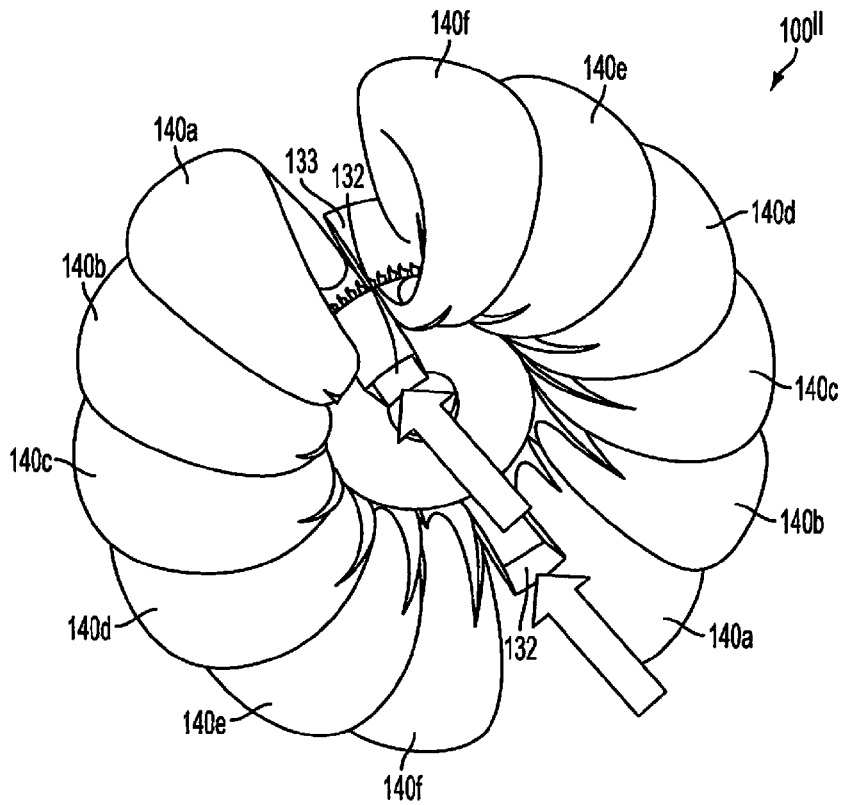
FIGS. 15-16 are drawings that are useful for understanding alternative flow paths of the fluid in accordance with one or more embodiments of the invention.
Figure 16:
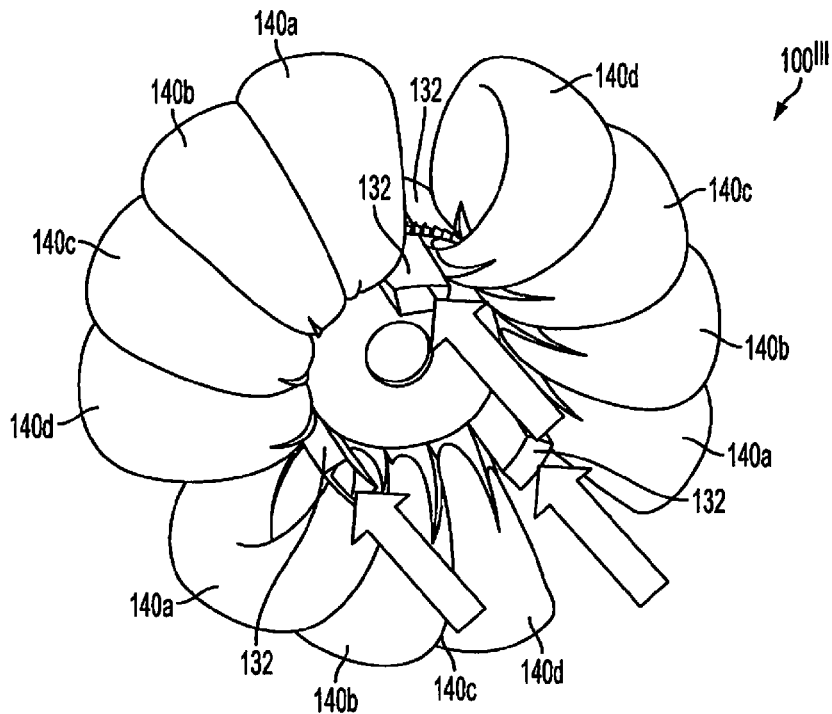

As illustrated in FIG. 14, the number of return zones 140a-140n is not limited to five as in the previously illustrated embodiments, but may be any number of return zones one or more such that the fluid passes across the working assembly 110 at least twice. Furthermore, as illustrated in FIGS. 15 and 16, the fluid working apparatus 100", 100'" may have more than one housing inlet 132 and corresponding housing outlet 133. In the embodiment illustrated in FIG. 15, the fluid working apparatus 100" includes two housing inlets 132, with each housing inlet providing a flow path through six return zones 140a-140f such that the fluid working traveling each path passes the working assembly 110 seven times. In the embodiment illustrated in FIG. 16, the fluid working apparatus 100'" includes three housing inlets 132, with each housing inlet providing a flow path through four return zones 140a-140d such that the fluid working traveling each path passes the working assembly 110 five times. The number of inlets as well as the number of return zones for each flow path may be varied as desired.

Figures 17A, 17B:
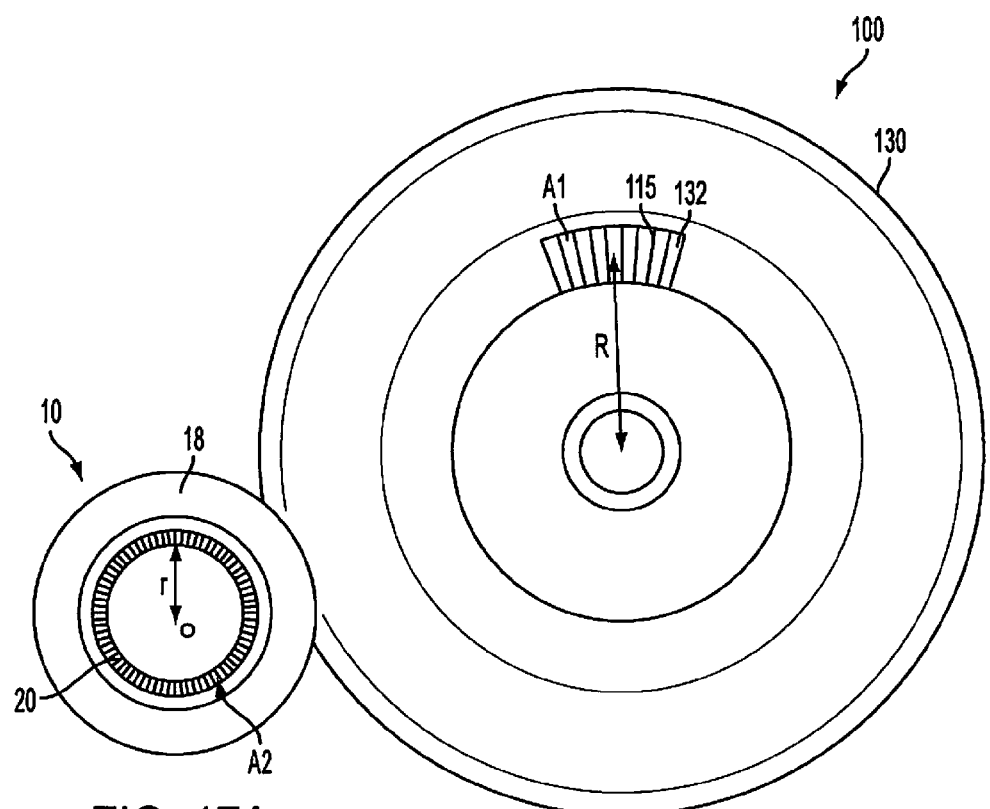
FIGS. 17A and 17B illustrate the inlet area of an exemplary fluid working apparatus of the present invention relative to the inlet area of a prior art axial turbo-expander.

Having described the general configuration of exemplary embodiments of the fluid working apparatus 100, a comparison relative to an axial flow device will be provided with reference to FIGS. 17A-26. Referring to FIGS. 17A and 17B, an exemplary fluid working apparatus 100 is show with a prior art axial turbo-expander 10 with an equivalent flow rate. The fluid working apparatus 100 has an inlet 132 which extends over a partial circumference while the turbo-expander 10 has an inlet 20 extending about the complete circumference. As such, if the inlet areas A1 and A2 are to be equal, the apparatus 100 has a larger radius R and larger blade height than the radius r and blade height of the turbo-expander 10. The larger rotor diameter can be tuned to provide increased torque output in the fluid working apparatus 100.

FIG. 18 illustrates the effective work performed by the fluid working apparatus 100 compared to that of the turbo-expander 10 with equivalent flow rates V1 and V2. As illustrated here, the apparatus 100 has five return zones R1-R5 such that work is performed on the rotor blades 115 six times as shown 1-6. In this example, the apparatus 100 has twenty four larger blades relative to the turbo-expander 10 having a single stage with twenty-four smaller blades, each addressing the same initial working fluid flow conditions. Due to the larger radius R, the rotor blades 115 are three times the size as the rotor blades of the turbo-expander 10. In relative and simplistic terms, the performance of the device may be viewed as W=F*B*S*N*P wherein F is the work flow, B is the number of blades, S is the relative size of the blade, N is the number of passes and P is the available drive pressure ratio. For a work flow of 100, the apparatus 100 work W=100*4*1*6*½=1200 while the turbo-expander 10 work W=100*24*⅓*1*1=800. In this example, the fluid working apparatus 100 achieves fifty percent more work than the turbo-expander 100 with an equivalent work flow. This is a simplified comparison for illustration purposes only. It is recognized that a broad range of complex equations are used to calculate turbine performance. It is known generally that for low pressure, slower speed flows it is desirable to have a larger blade area to interface with the working fluid. The exemplary apparatus 100 provides this feature.

FIGS. 19 and 20 illustrate the respective flow paths 102, and associated time of expansion, as the working fluid flows through the axial turbo-expander 10 and an exemplary fluid working apparatus 100 of the present invention. As shown in FIG. 19, the flow 102 through the turbo-expander 10 is a single axial flow across the single stage. As illustrated in FIG. 20, this flow provides a minimal amount of time for expansion of fluid passing through the turbo-expander 10. Even in a five stage axial turbo-expander 10', the time for expansion is relatively minimal. In the illustrated fluid working apparatus 100, the flow travels through four return zones 140a-140d such that five working stages 1-5 are utilized, as illustrated in FIG. 19. With the multiple passes of the working fluid along with the time of travel through the return zones 140a-140d, the time for expansion through the apparatus 100 is substantially greater than even the five stage turbo-expander 10'. The fluid working apparatus 100 of the present invention provides a simpler construction, which is easier and less costly to produce, which achieves higher performance.

FIGS. 21A, 21B, 23, 25A and 25B provide tables illustrating exemplary data of a fluid working apparatus 100 and axial turbo-expanders 10, 10' based on computer models. The five stage configurations are based on common inlet nozzle, with pressure drop of 20 psi from a starting Temp of 235 F and pressure of 65 psi. All configurations use a mixed working fluid comprising 6 lbm/s flow of methanol and 5 lbm/s nitrogen. For the five stage configurations, the average flow velocity is equilibrated at 351 MPH. All comparisons start with an initial enthalpy energy of 4,053 kW.

FIGS. 21A and 21B illustrate the projected data of a single rotor fluid working apparatus 100 with five working zones defined about its circumference to achieve five stages. With a blade diameter of 14.2" ID and 19" OD and an inlet flow velocity of 349 mph, the apparatus 100 achieves a power output=343 kW.

Figures 22, 23:
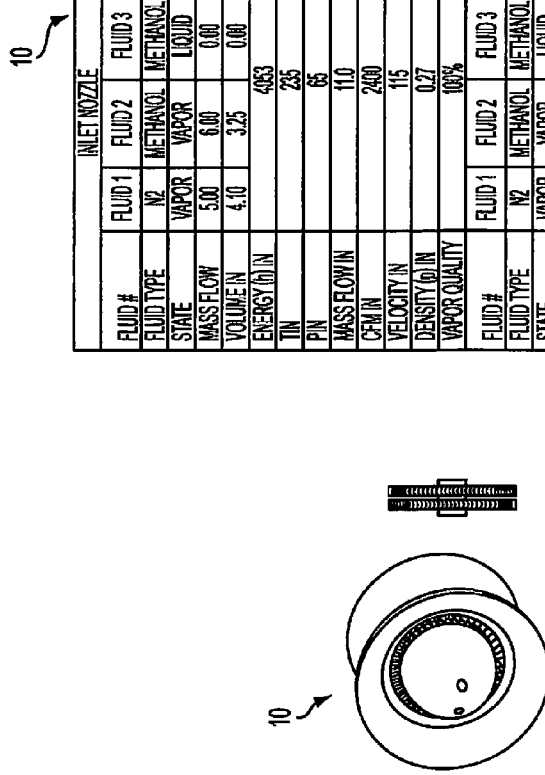
FIG. 22 shows an exemplary prior art, single rotor axial turbo-expander
FIG. 23 is a table showing exemplary measurements therefore.
Figure 24:
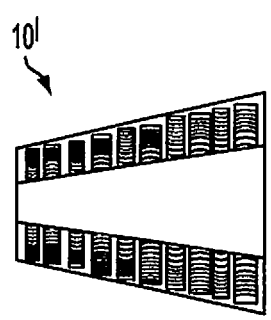
FIG. 24 shows an exemplary prior art, five rotor axial turbo-expander.

In comparison, FIGS. 23 and 25A and 25B illustrate projected data for a single stage axial turbo-expander 10 similar to that illustrated in FIG. 22 and a five stage axial flow expander 10' similar to that illustrated in FIG. 24, respectively. These comparisons are relative performance profiles without regard to design specifics, e.g. drag losses in the flow channels or the like. The turbo-expander 10 has a blade diameter of 5.0" ID×6.6" OD, and turbo expander 10' has a blade diameter of 6.6" ID×8" OD (growing progressively to 10"OD in the last stage). As shown in FIG. 23, with an inlet flow velocity=811 mph, the turbo-expander 10 achieves a power output=243 kW. As shown in FIGS. 25A and 25B, with an average flow velocity=351 mph, the five stage turbo-expander 10' achieves a power output=287 kW.

Figure 26:
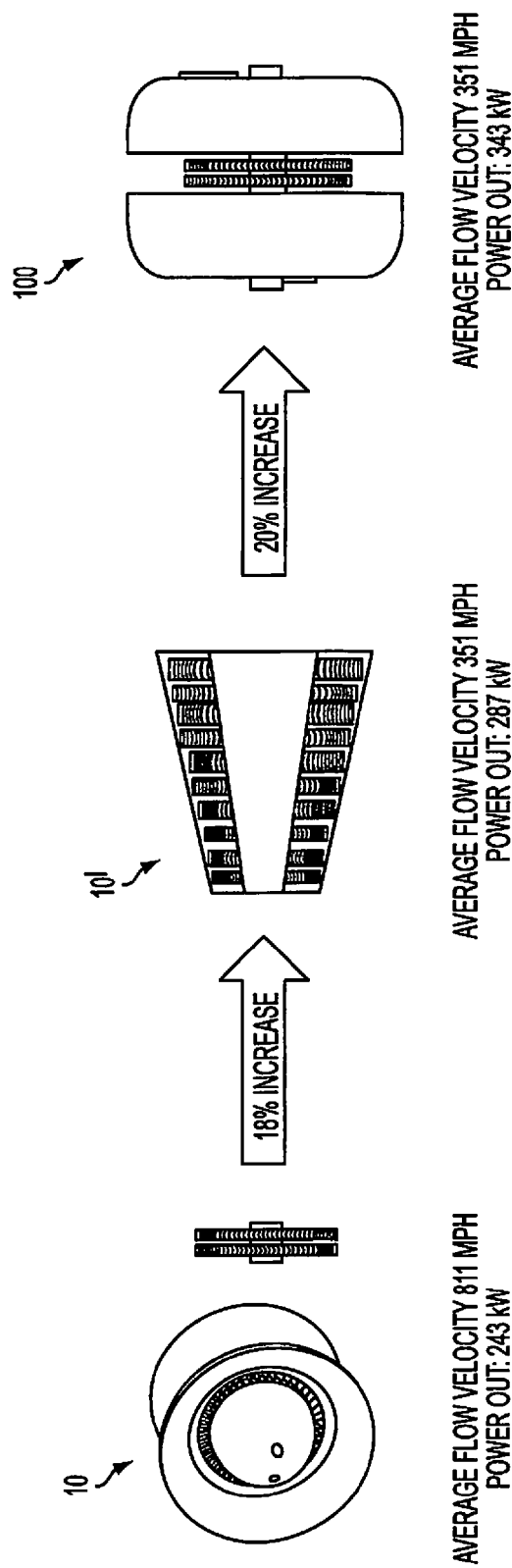
FIG. 26 is a drawing representing the data from the various tables from FIGS. 21A, 21B, 23, 25A and 25B.

FIG. 26 summarizes the exemplary data of FIGS. 21A, 21B, 23, 25A and 25B. As shown, the single rotor fluid working apparatus 100 provides a 23% increase over the five stage turbo-expander 10' and an 18% increase over the single stage turbo-expander 10. It is noted that the constructs of the present invention provide the opportunity to convert power from lower pressure flows. This is achieved do to the larger blade area and slower rotational speeds for an equivalent volume of flow.

Figure 27:
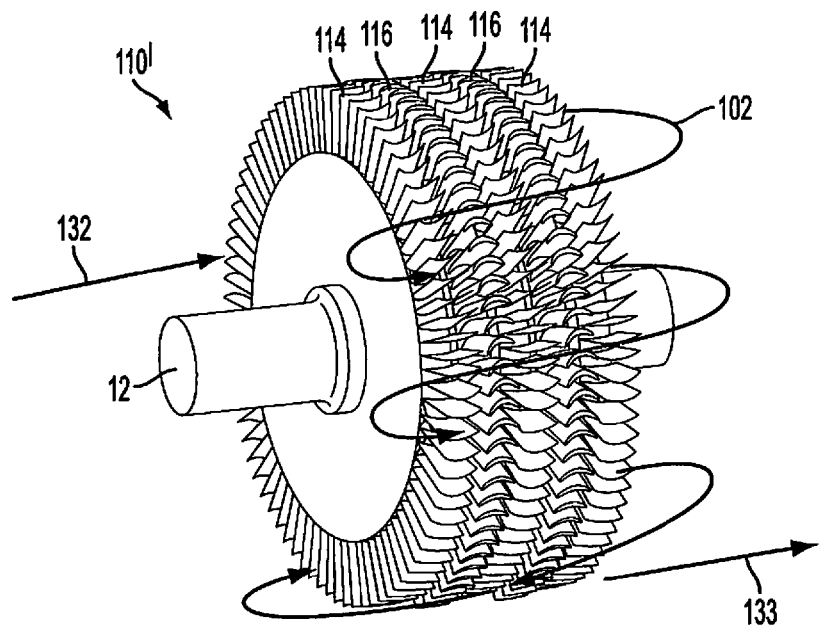
FIG. 27 is an isometric view of a working assembly of an alternative exemplary embodiment of the present invention.
Figure 28:
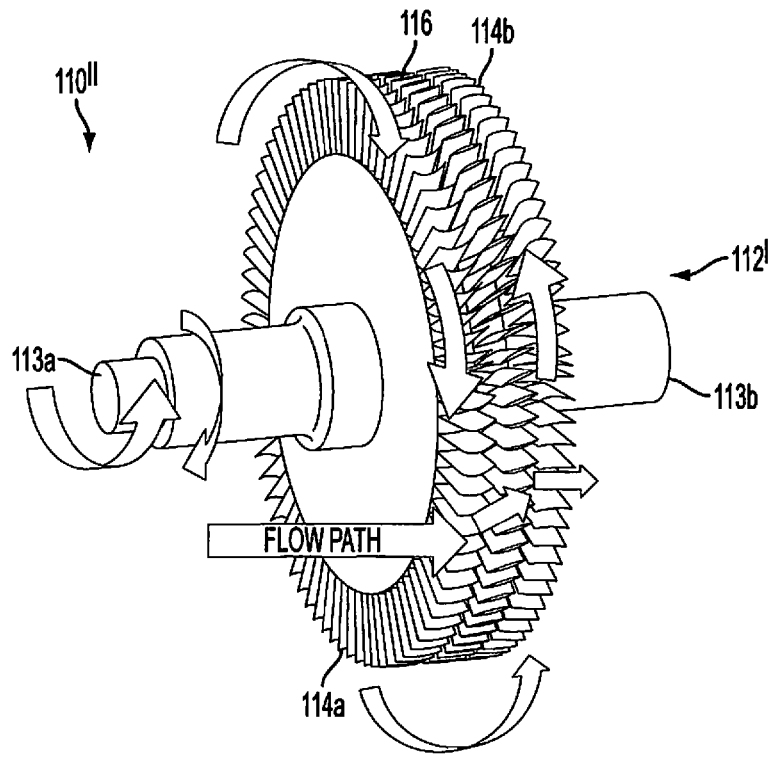
FIG. 28 is an isometric view of a working assembly of an alternative exemplary embodiment of the present invention.

Referring to FIGS. 27 and 28, additional exemplary working assemblies 110' and 110" are illustrated. In the embodiment of FIG. 27, the working assembly 110' has a shaft 112 with three rotors 114 and two stators 116. The working assemblies of the present invention may have any desired number of rotors and stators. In the illustrated embodiment, the flow path 102 is such that the flow 102 is returned three times and thereby passes across all three rotors 114 four times between the inlet 132 and outlet 133. As such, the working assembly 110' provides twelve working stages.

The working assembly 110" of FIG. 28 illustrates a multi-part shaft 112'. The inner shaft 113A is associated with the rotor 114A and the outer shaft 113B is associated with the rotor 114B. In the illustrated embodiment, the rotors 114A and 114B have opposite configurations such that the fluid flow causes the inner shaft 113A to rotate counter-clockwise while the outer shaft 113B rotates clockwise. Alternatively, the shafts 113A and 113B may rotate in the same direction and may be selectively coupled or decoupled to one another. Any desired shaft configuration is within the scope of the present invention.

Figure 29:
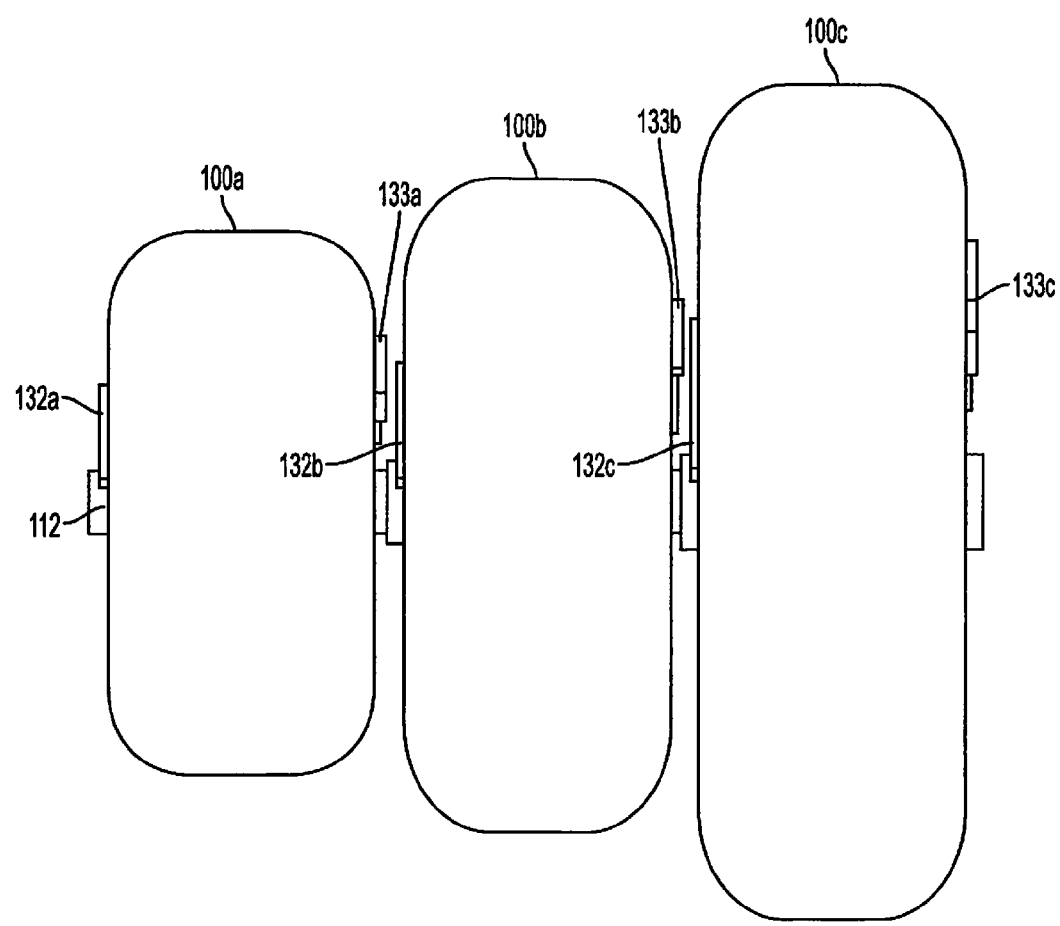
FIG. 29 is a drawing illustrating multiple fluid working apparatuses connected in series.

FIG. 29 illustrates multiple fluid working apparatuses 100A-110C connected to one another in series. Fluid passes into the first apparatus 100A via inlet 132A, loops through multiple stages and exits through outlet 133A. Fluid from outlet 133A then travels into the second apparatus 100B via inlet 132B, loops through multiple stages and exits through outlet 133B. Fluid from outlet 133B then travels into the third apparatus 100C via inlet 132C, loops through multiple stages and exits through outlet 133C. Fluid couplings, not shown, are provided between each outlet and the next inlet The apparatuses 100A-100C may have different configurations to facilitate different conditions, for example, high pressure fluid entering inlet 132A while progressively lower pressure fluid enters inlets 132B and 132C. The apparatuses 100A-100C may share a common shaft 112 as illustrated or may have separate shafts. In all other aspects, the fluid working apparatuses 100A-100C operate in accordance with the various embodiments described herein.

Figure 30:
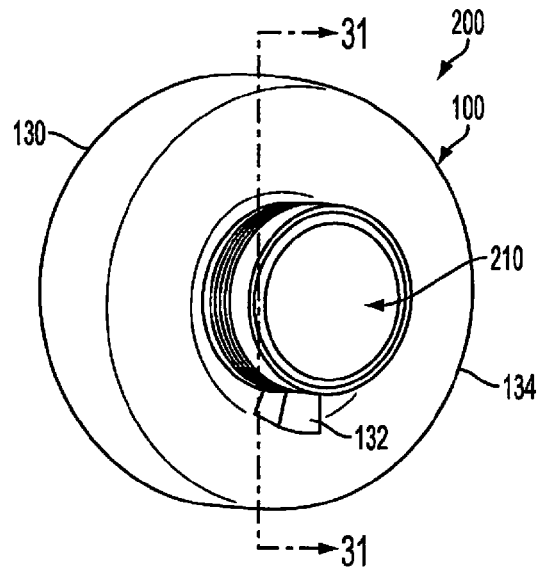
FIG. 30 is an isometric view of a generator device incorporating an exemplary fluid working apparatus of the present invention.
Figure 31:
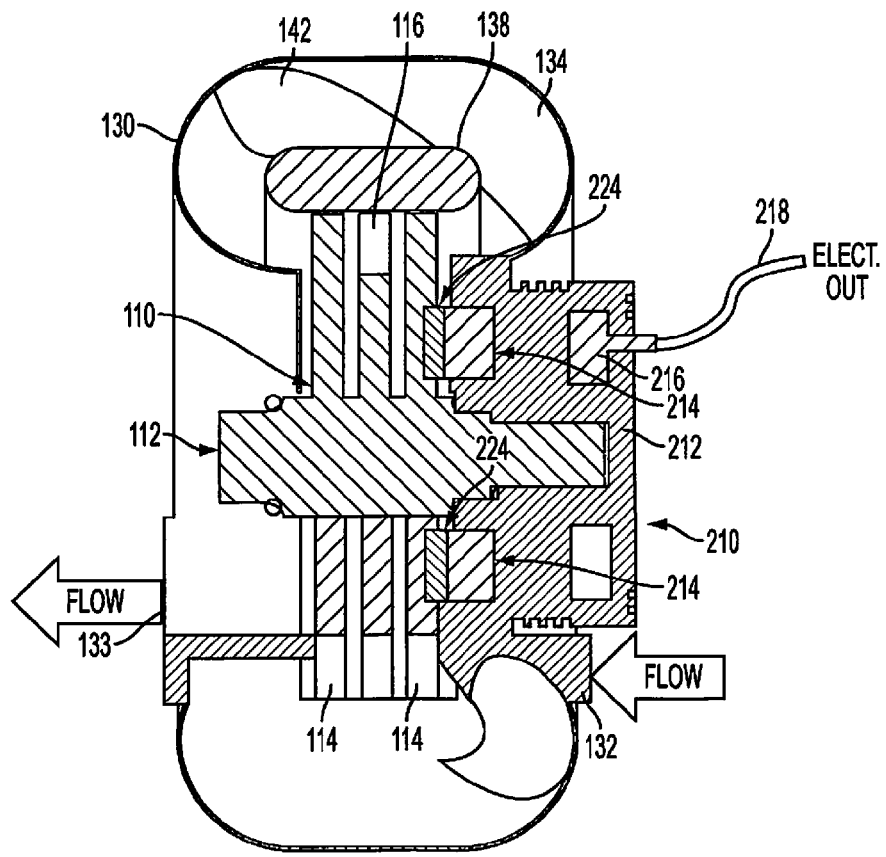
FIG. 31 is a cross-sectional view along the line 31-31 in FIG. 30.

Referring to FIGS. 30 and 31, a generator or motor device 200 incorporating a fluid working device 100 in accordance with the invention is illustrated. The fluid working device 100 is substantially as described above and includes a working assembly 110 positioned within a housing 130. The generator device 200 further includes a generating or motor unit 210 supported by the housing 130. The unit 210 includes a housing 212 which is positioned within the center of the tubular outer housing member 134. Preferably the housing 112 encapsulates one end of the shaft 112 and is fluidly sealed relative to the housing 130. The opposite end of the shaft 112 may be sealed relative to the housing 130 such that the generator device 200 is a sealed unit, similar to a refrigeration compressor.

An embodiment of such a device configuration may include one or more fixed magnets 214 supported within the housing 212 adjacent to one of the rotors 114. The magnets 214 are aligned with corresponding magnets 224 mounted on the rotor 114 such that the magnets 224 rotate therewith. The configuration would allow the outer housing 134 and the housing 212 to provide a complete enclosure isolated from the generator or motor unit. In a generator configuration, conversion unit 216 within the housing 212 converts the mechanical energy generated by the rotating rotors 114 to electrical energy in a known manner. The electrical energy is then transferred by an electrical outlet 218, for example, an electrical wire, to a desired circuit. Inversely, if used as a motor driven compressor or the like, electrical energy is received in the conversion unit and it is then converted and the interaction between the magnets 214 and 224 cause the rotor 114 to rotate.

Various modifications may be made to the components of the fluid working apparatus 100 to achieve a desire output based on variable conditions. The performance of the overall apparatus 100 is dictated by many artifacts of the fluids being used to drive the device including but not limited to: the inlet fluid pressure, exit fluid pressure, the density, the velocity of the flow, the overall configuration of the housing that defines the loops, and the physical properties that make up the working fluid. These properties can include temperature, and available heat that affect the density and therefore volume of the flow. In general terms, the ability for the apparatus to transmit the energy within the working fluid to the rotors relies on a plurality of relationships between the housing, inlet guide vanes, the blades, the stators if used and the exit guide vanes. In addition, the working fluid expansion chambers, created by the housing, provides a better opportunity for the thermal energy in the working fluid to be converted to kinetic energy in the flow. Specifically, the longer distance from outlet to inlet of a stage enables a longer acceleration period. Slower acceleration rates to achieve the equivalent fluid velocity at the next inlet requires less energy to produce, and this can be equated to requiring less drive pressure between the stages.

Figure 32:
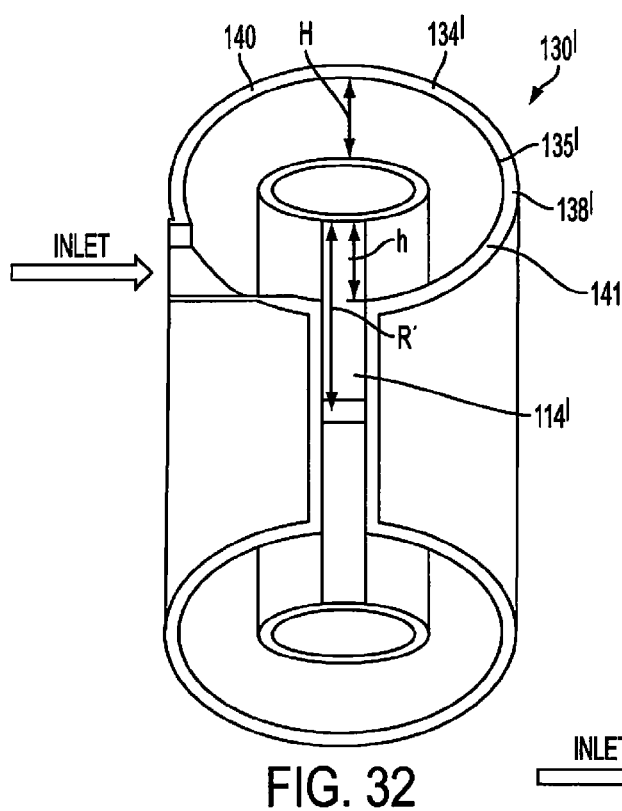
FIG. 32 is a cross-sectional view of an exemplary housing in accordance with an embodiment of the invention.
Figure 33:
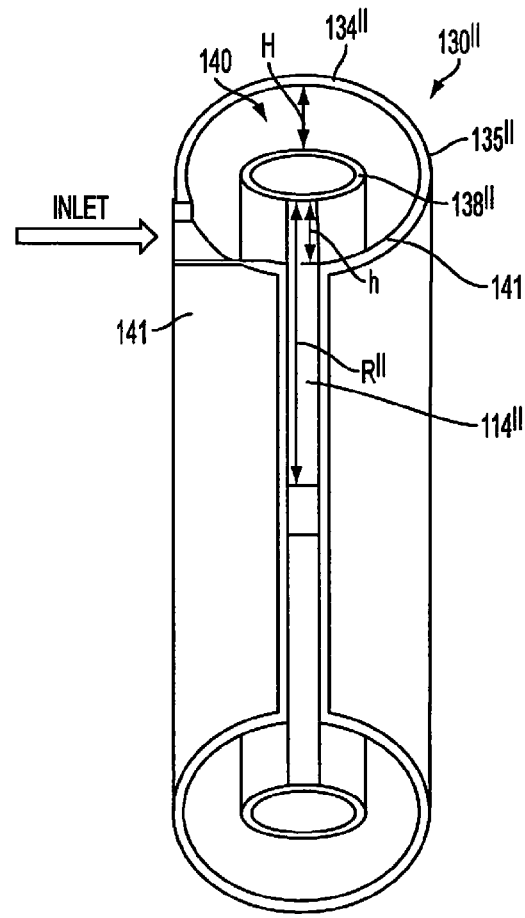
FIG. 33 is a cross-sectional view of another exemplary housing in accordance with an embodiment of the invention.

For the same inlet area and working fluid flows it is possible to reconfigure the physical architecture of the housing to provide unique (different) shaft output properties. Referring to FIGS. 32 and 33, two exemplary housings 130', 130" are illustrated. Both housings 130', 130" include an outer housing member 134', 134" with an inner housing member 138', 138" positioned within the tubular portion 135', 135" thereof. In each case, a working flow chamber 141 having a height h is defined between the radially inward portions of the housing members 134', 134" and 138', 138" and a return chamber 140 having a height H is defined between the radially outward portions of the housing members 134', 134" and 138', 138". In these illustrated embodiments, the heights h and H are substantially the same. The difference between the housings 130' and 130" is that housing 130' has a smaller radius R' than the radius R" of the housing 130", each with correspondingly sized rotors 114', 114". Assuming a constant (or the same) working fluid flow rate for both, with the same gross inlet area 132' and 132", an apparatus with the housing 130' with the smaller radius R' would operate at a higher rotational speed with less torque. Conversely, an apparatus with the housing 130" with the larger radius R" would operate at a slower turbine rotational velocity, providing a higher torque to the shaft.

Referring to FIGS. 34-39, other exemplary housing configurations are illustrated. The embodiment of FIGS. 34 and 35 are similar to that of FIG. 32 and show the housing 130' having a working flow chamber 141 having a height h that is substantially the same as the maximum height H of the return chamber 140. This configuration of FIG. 34 provides a constant or near constant cross sectional flow area.

In the housing 130''' of FIGS. 36 and 37, the outer housing member 134''' and the inner housing member 138''' are configured such that the working flow chamber 141''' has a height h that is substantially smaller than the maximum height H of the return chamber 140'''. As a result, the return chamber 140''' defines a diffuser portion 127 and a nozzle portion 129. The diffuser portion 127 will slow the flow and allow the fluid a longer period to exchange thermal energy to motive energy (expansion) which is desirable for creating drive motive force later in the nozzle of the next pass through the blades 115. This is accomplished by enabling the flow a brief period of expansion (and therefore cooling) which results in an increased volumetric flow rate at a lower pressure. The nozzle portion 129 affords the opportunity to speed the flow up. Speed in the flow is desirable for transferring the fluid motive force into motion of the blades by means of transferring inertia from the flow to rotors.

Figure 38:
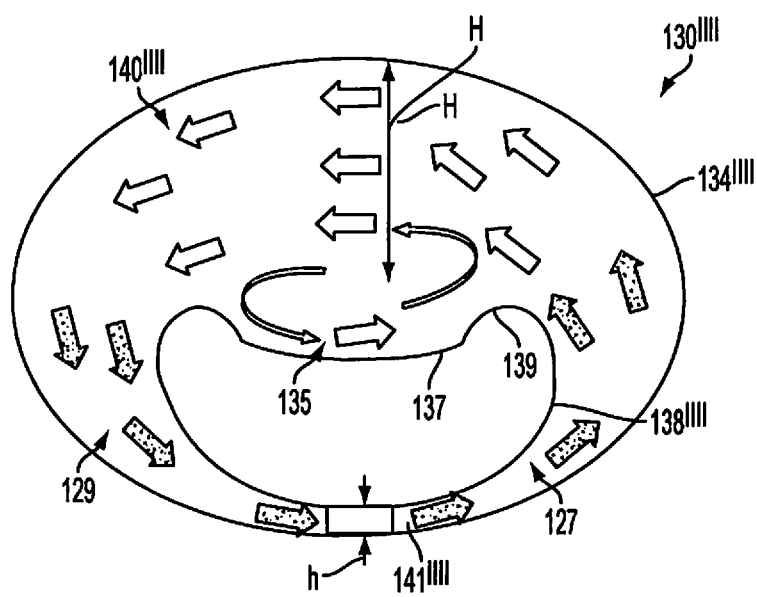
FIGS. 38-41 are drawings illustrating fluid flow through other exemplary housings.

FIG. 38 illustrates a housing 130'''' similar to the housing 130''' in that the outer housing member 134'''' and the inner housing member 138'''' are configured such that the working flow chamber 141'''' has a height h that is substantially smaller than the maximum height H of the return chamber 140''''. In the present embodiment, the outer surface 139 of the inner housing member 138'''' includes a recessed portion 137 such that a chamber 135 is defined adjacent the diffuser portion 127. The chamber 135 may be configured to facilitate greater mixing of the working fluid as it travels through the return chamber 140''''. Other profiles of the chambers or configurations of the housing members may be utilized to create turbulence or swirling that may be beneficial in certain applications. It is important to note that both the outer housing profile and the inner housing profile can be changed to create the desired working flow chamber. Further they do not need to be the same profile from zone to zone. It is therefore possible to have the chamber of the first zone look similar to FIG. 34 and the chamber of the last zone could look like FIG. 36.

Figure 39:
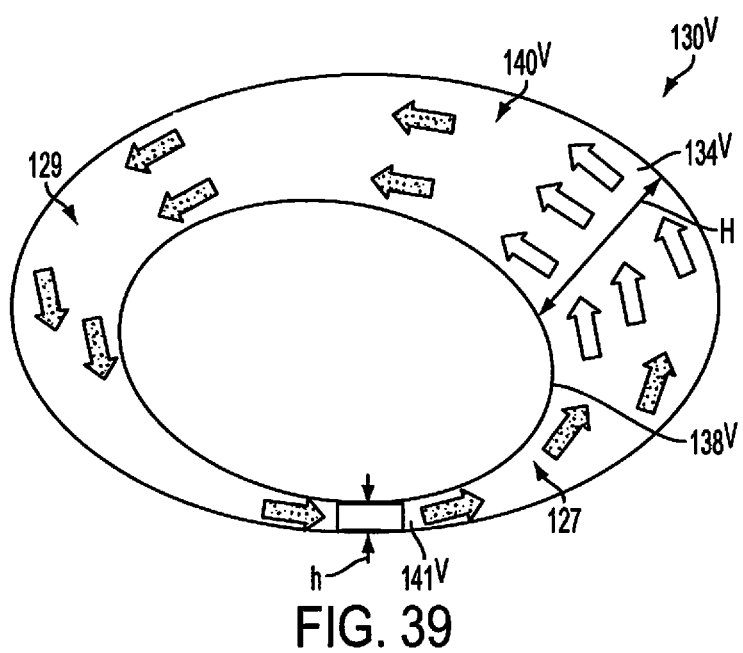

FIG. 39 illustrates a housing 130$^v$ similar to the housing 130''' in that the outer housing member 134$^v$ and the inner housing member 138$^v$ are configured such that the working flow chamber 141$^v$ has a height h that is substantially smaller than the maximum height H of the return chamber 140$^v$. In the present embodiment, the maximum height H, and thereby the diffuser portion 127, is radially offset such that the flow experiences a more rapid expansion followed by a longer nozzle 129. The housing configurations are not limited to those illustrated and it is understood that various other housing configurations may be utilized to control flow through the housing.

Figure 40:
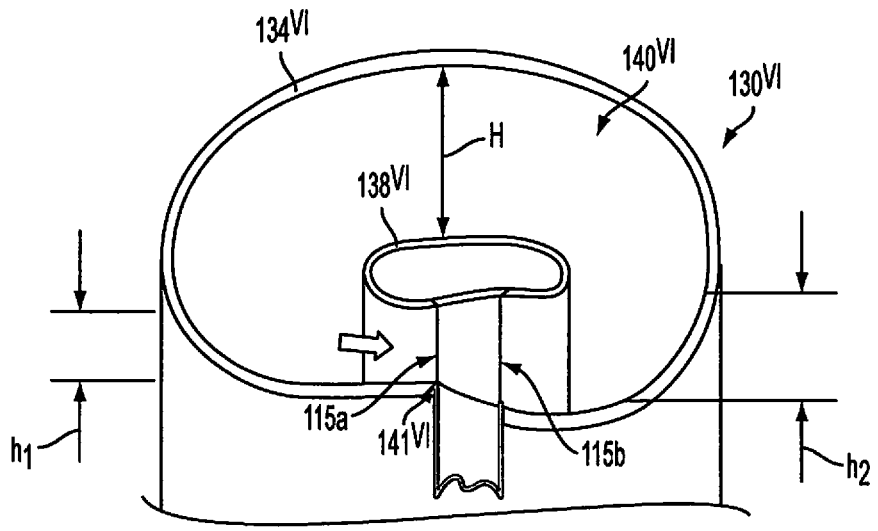

FIG. 40 illustrates a housing 130$^{vi}$ similar to the housing 130''' in that the outer housing member 134$^{vi}$ and the inner housing member 138$^{vi}$ are configured such that the maximum height H of the return chamber 140$^{vi}$ is greater than the height h1, h2 of the working flow chamber 141$^{vi}$. In the present embodiment, the height h1 of the leading portion of the working flow chamber 141$^{vi}$ is smaller than the height h2 of the trailing portion of the working flow chamber 141$^{vi}$. Such configuration of the housing 130$^{vi}$ facilitates a structure wherein the blades have a varying configuration with a smaller leading edge 115a and a larger trailing edge 115b. The mass flow rate through a turbine may be assumed constant and as the velocity of the flow changes, as it passes over the blade, the flow cross sectional area is allowed to change as well. In this exemplary embodiment, with the change in blade width and flow cross sectional area going from smaller to larger, the flow velocity will slow down.

Figure 41:
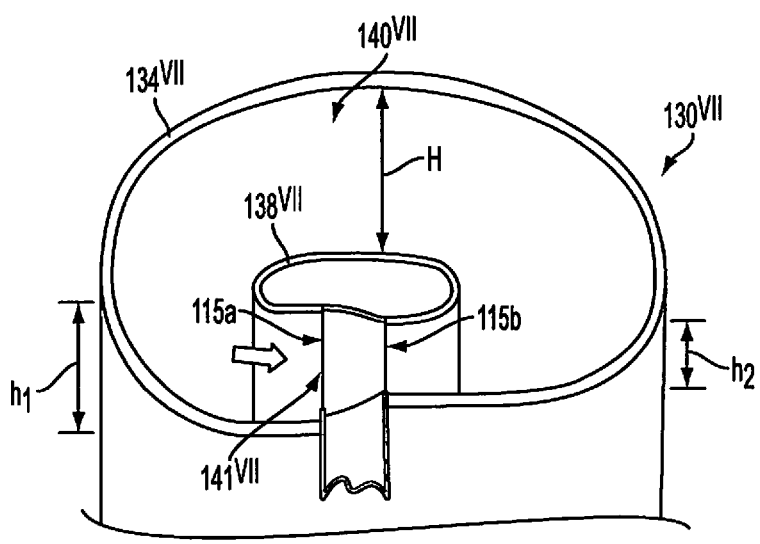
Figure 44:
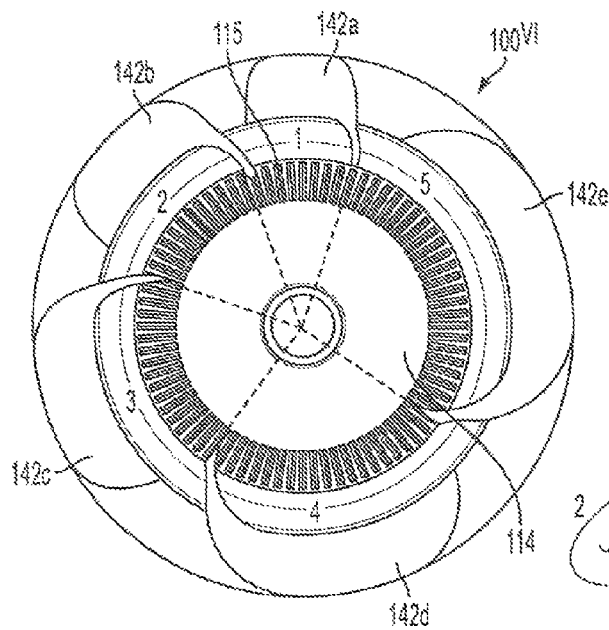
FIG. 44 is a front elevation similar to FIG. 42 with a portion of the outer housing omitted.

FIG. 41 illustrates a housing 130$^{vii}$ is similar to the housing 130$^{vi}$ in that the outer housing member 134$^{vii}$ and the inner housing member 138$^{vii}$ are configured such that the maximum height H of the return chamber 140$^{vii}$ is greater than the height h1, h2 of the working flow chamber 141$^{vii}$. In the present embodiment, the height h1 of the leading portion of the working flow chamber 141$^{vii}$ is larger than the height h2 of the trailing portion of the working flow chamber 141$^{vii}$. Such configuration of the housing 130$^{vii}$ facilitates a structure wherein the blades have a varying configuration with a larger leading edge 115a and a smaller trailing edge 115b. In this exemplary embodiment, with the change in blade width and flow cross sectional area going from larger to smaller, the flow velocity will speed up.

The housing configurations are not limited to those illustrated and it is understood that various other housing configurations may be utilized to control flow through the housing.

Figure 45:
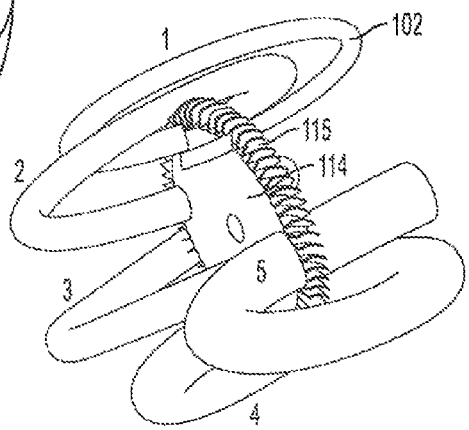
FIG. 45 is a drawing illustrating fluid flow through the fluid working apparatus of FIG. 42.
Figure 42:
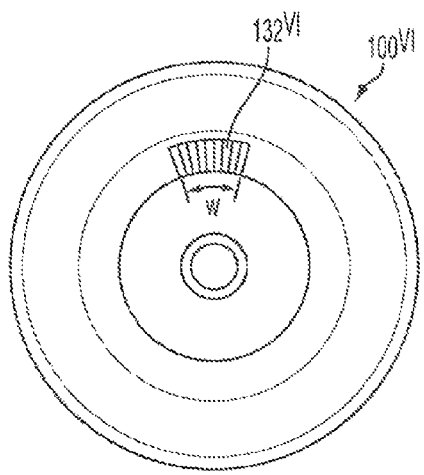
FIG. 42 is a front elevation view of a fluid working apparatus in accordance with an exemplary embodiment of the present invention.
Figure 43:
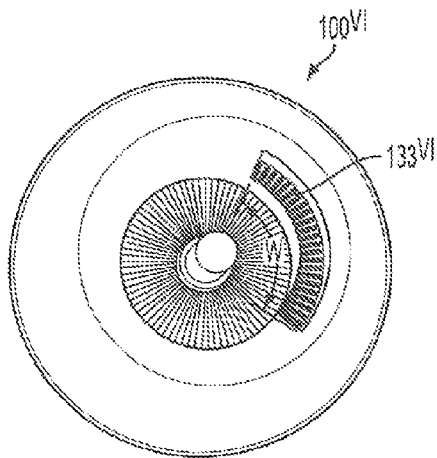
FIG. 43 is a rear elevation view of the fluid working apparatus of FIG. 42.

Referring to FIGS. 42-45, an alternative method of controlling flow through the fluid working apparatus $100^{vi}$. In the present embodiment, the circumferential spacing of the boundary vanes 142a-142e is varied such that the circumferential width of the working zones 1-5 correspondingly varies. Referring to FIG. 42, the vanes 142a and 142b are spaced such that the working zone 1 has a circumferential width encompassing nine rotor blades 115. The vanes 142b and 142c are spaced such that the working zone 2 has a circumferential width encompassing eleven rotor blades 115. The vanes 142c and 142d are spaced such that the working zone 3 has a circumferential width encompassing sixteen rotor blades 115. The vanes 142d and 142e are spaced such that the working zone 4 has a circumferential width encompassing twenty rotor blades 115. The vanes 142e and 142a are spaced such that the working zone 5 has a circumferential width encompassing twenty-five rotor blades 115. FIG. 45 illustrates how the volume of the flow 102 increases as it passes through the stages of the present embodiment. As shown in FIGS. 42 and 43, the housing inlet $132^{vi}$ has a width w corresponding to the width of the first working zone 1 and the housing outlet $133^{vi}$ has a width W corresponding to the width of the last working zone 5, in this case growing in width from zone to zone (or chamber to chamber).

Figure 46:
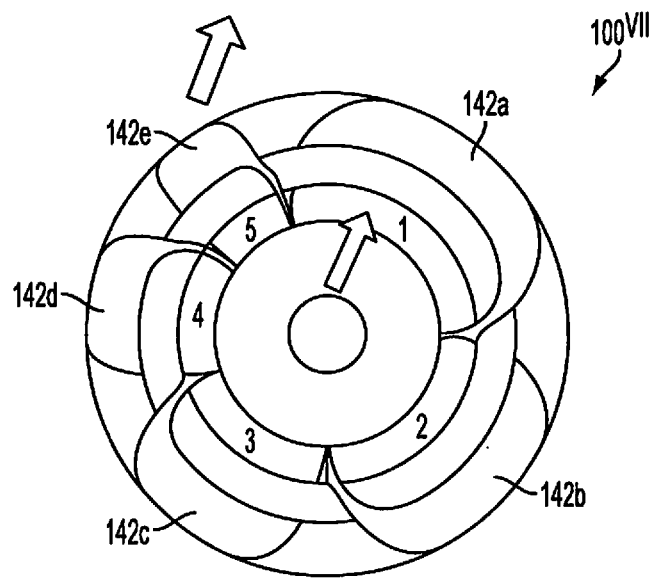
FIG. 46 is a front elevation similar to FIG. 44 illustrating another exemplary embodiment of the present invention representing a compressor configuration.
Figure 47:
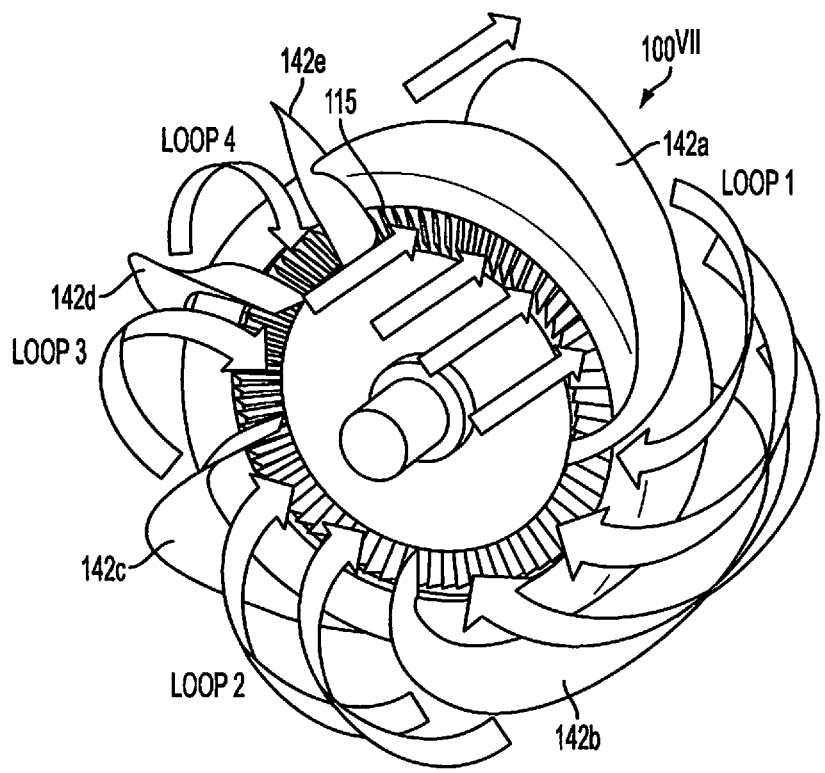
FIG. 47 is an isometric view of the fluid working apparatus of FIG. 46.

While the widths in the current embodiment progressively increase, the invention is not limited to such and the position of the vanes 142 may be varied in any desired manner. For example, the width of the zones may increase every other zone, with the width of the intermediate zone remaining constant. FIGS. 46 and 47 show a fluid working apparatus $100^{vii}$ wherein the circumferential width decreases from the first working zone 1 to the last working zone 5. Such a configuration may be utilized when the fluid working apparatus $100^{vii}$ is utilized as a compressor. Other combinations of increasing or decreasing widths may be utilized to achieve desired flow patterns. Furthermore, it is noted that in certain applications, the working fluid may be a non-expansive or compressive working fluid and the flow chambers will have a constant or near constant cross section.

Figure 48:
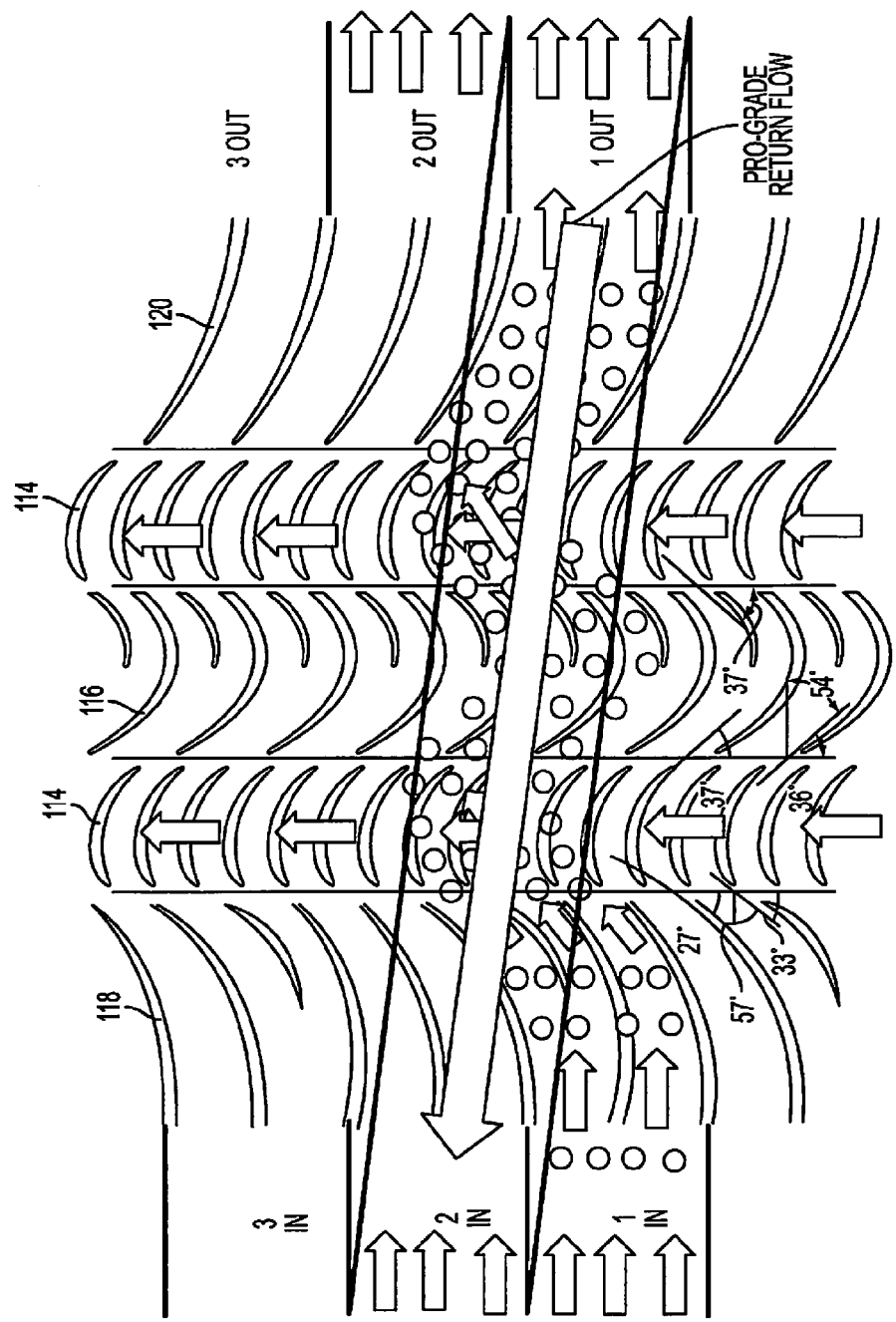
FIGS. 48 and 49 are drawings that are useful for understanding different flow options through the exemplary fluid working apparatus of the present invention.
Figure 49:
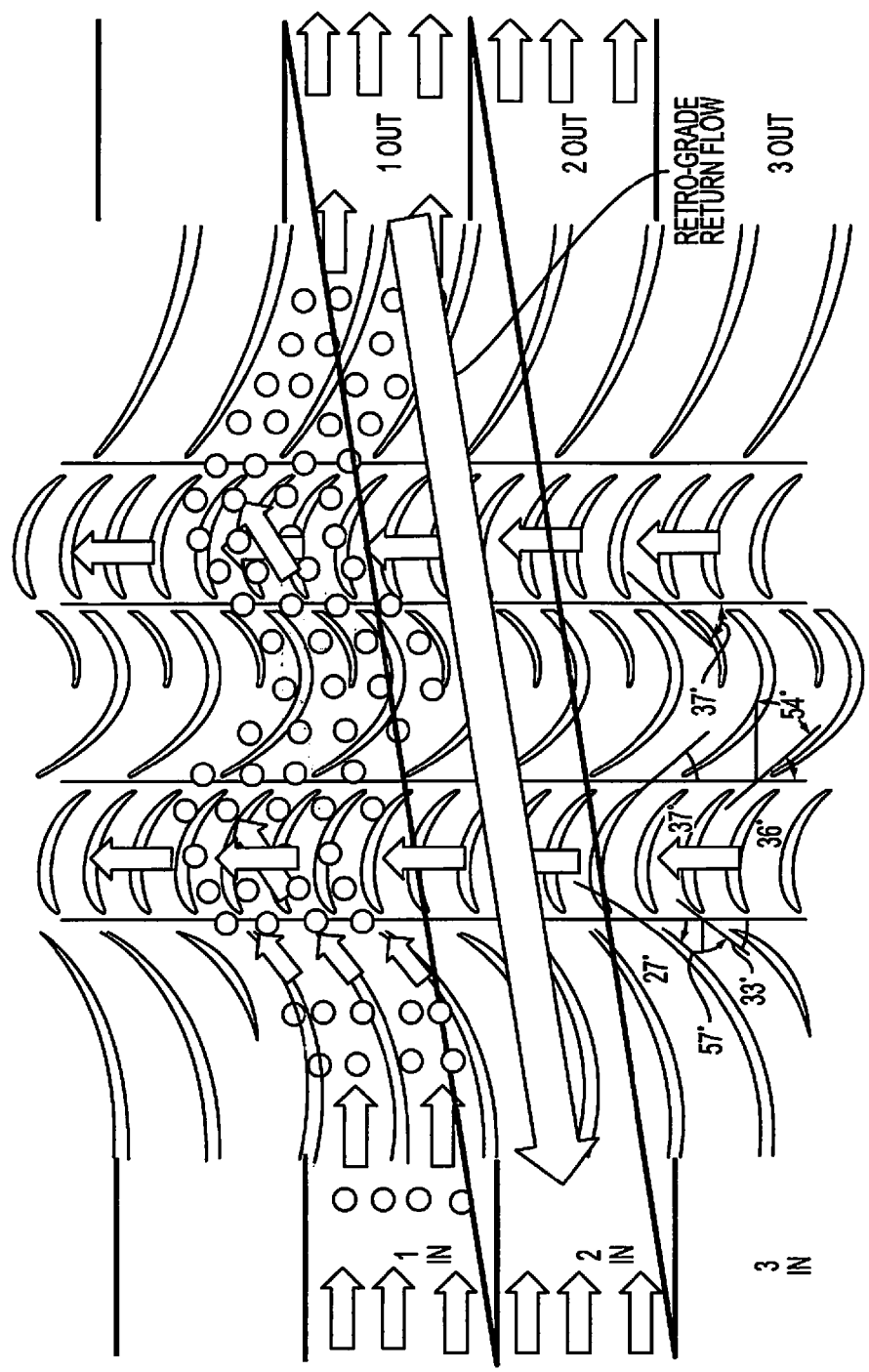

Referring to FIGS. 48 and 49, another manner of controlling the flow through the apparatus 100 is to configure the helical nature of the boundary vanes 142 such that the return flow is either pro-grade or retro-grade. FIG. 48 shows a pro-grade return flow wherein the inlet of the next working zone is circumferentially offset from the outlet of the previous working zone in the same direction as the rotors 114 rotate. FIG. 49 shows a retro-grade return flow wherein the inlet of the next working zone is circumferentially offset from the outlet of the previous working zone in a direction opposite the direction the rotors 114 rotate. In some applications, pro-grade architecture is preferred as it may offer a shorter flow path, however, in some applications the retrograde configuration may advantageously provide a longer flow path between looping stages where the fluids interact with the rotor blades.

Figure 50A:
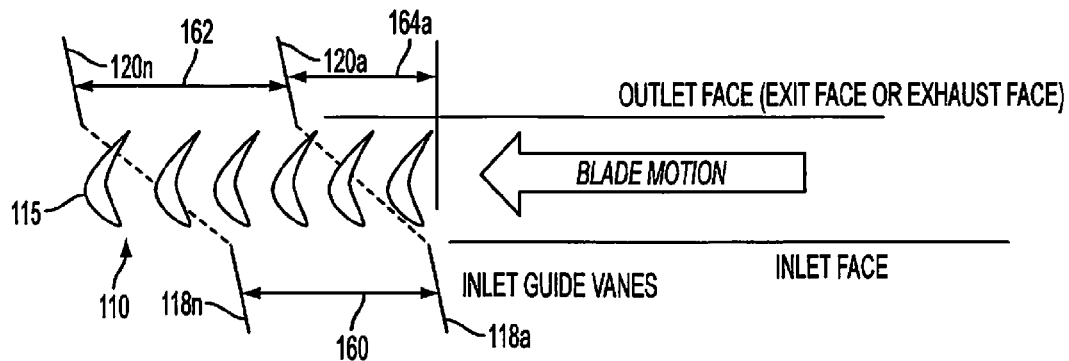
FIGS. 50A and 50B are top and elevation views, respectively, illustrating an exemplary stage offset configuration in accordance with an embodiment of the invention.
Figure 50B:
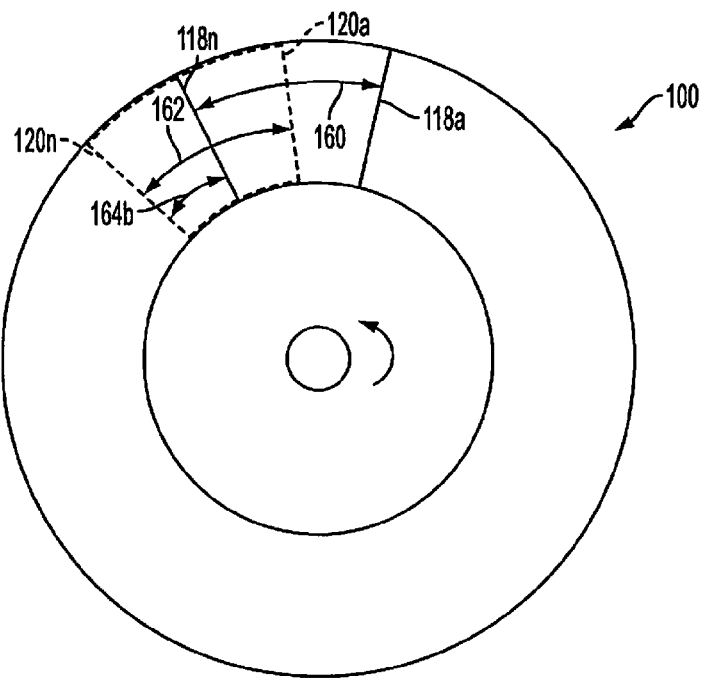
Figure 51:
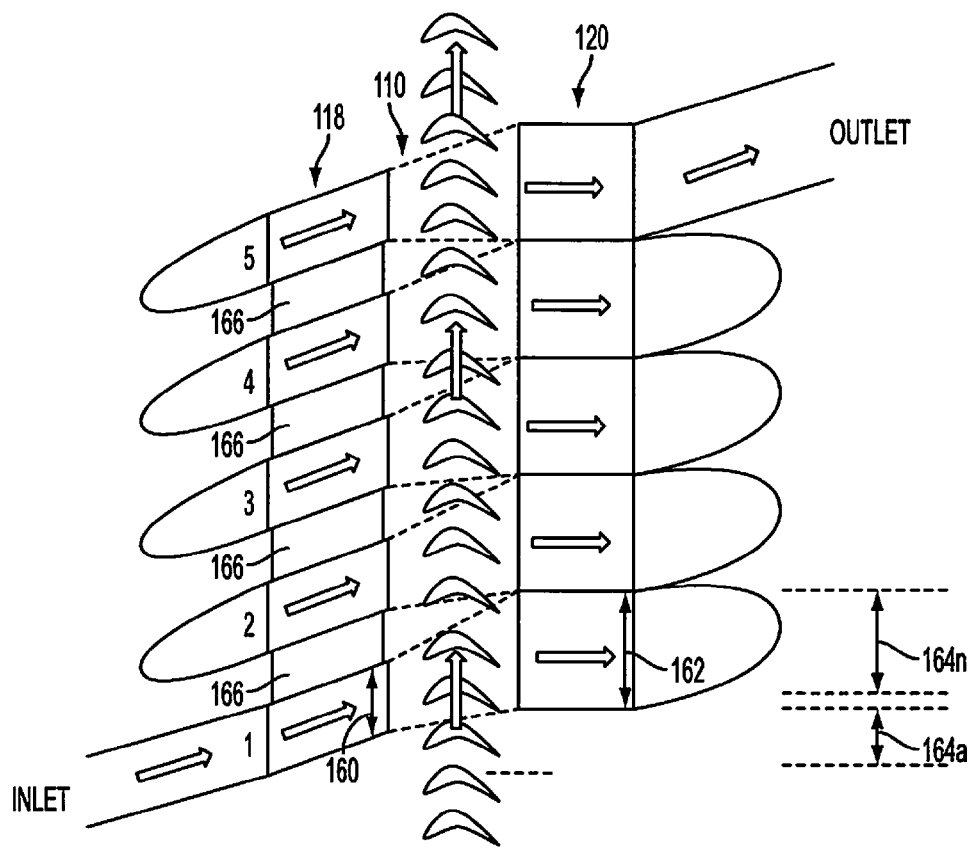
FIGS. 51-53 are drawings that are useful for understanding different stage transitions through the exemplary fluid working apparatus of at least one embodiment of the present invention.
Figure 52:
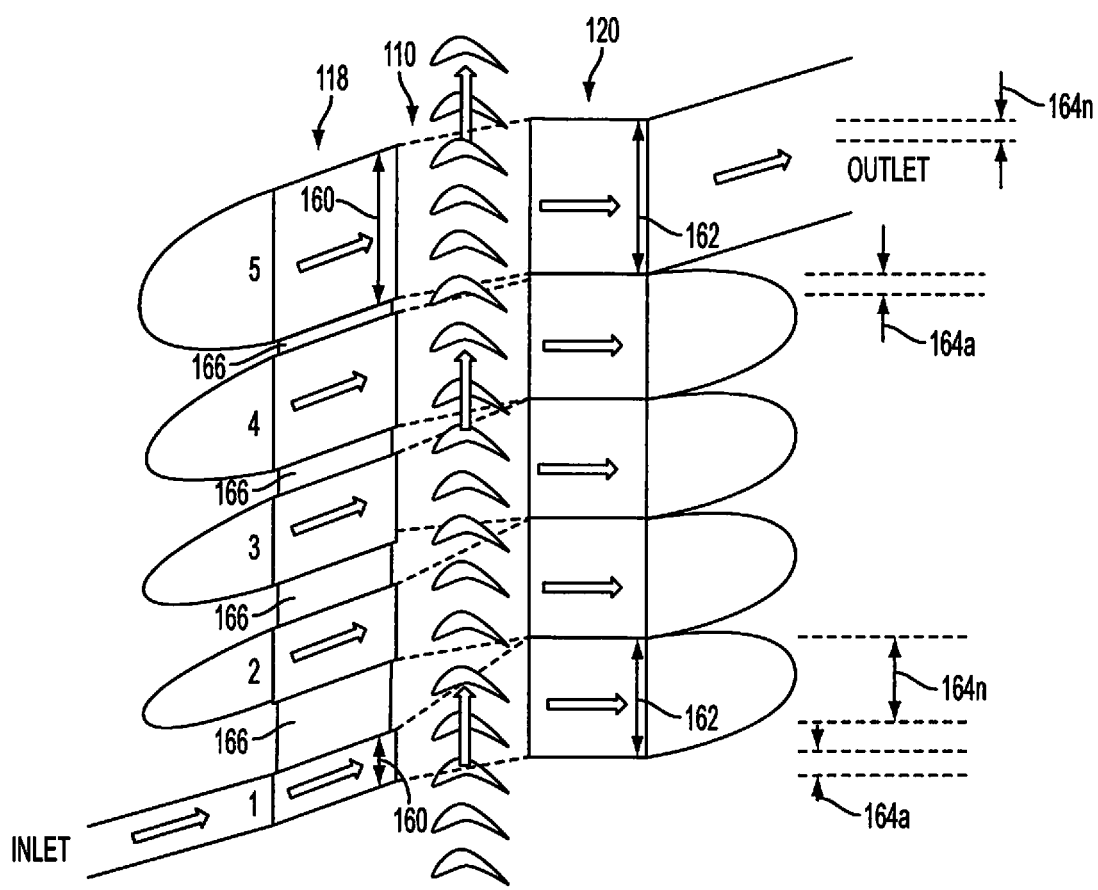

The flow may be further controlled or optimized by altering the configuration of the inlet and outlet vanes 118, 120. FIGS. 50A and 50B illustrate an exemplary embodiment wherein the outlet vanes 120a-120n for a given working zone are circumferentially offset from the inlet vanes 118a-118n of that working zone. More specifically, the inlet guide vanes 118 for a given zone extend a width 160 between the first inlet vane 118a of the zone and the last inlet vane 118n of the zone (the intermediate vanes are not shown). Similarly, the outlet guide vanes 120 for a that zone extend a width 162 between the first outlet vane 120a of the zone and the last outlet vane 120n of the zone (the intermediate vanes are not shown). The widths 160 and 162 may be equal as illustrated in FIGS. 50A and 50B or may be different as illustrated in FIGS. 51 and 52. Furthermore, the widths 160 or 162 between zones 1-5 may be different as illustrated in FIG. 52. As shown in FIGS. 51 and 52, the different spacing may be addressed by closing or sealing portions 166 defined between the inlet vane zones 1-5. The closing or sealing portions 166 may be defined by portions of the housing 130 or may be separate components.

The first outlet vane 120a is circumferentially offset a distance 164a from the first inlet vane 118a and the last outlet vane 120n is circumferentially offset a distance 164n from the last inlet vane 118n. In the embodiment of FIGS. 50A and 50B, the distances 164a and 164n are equal, however, FIG. 51 illustrates that the distances 164a and 164n may be different. Furthermore, as shown in FIG. 52, the difference between distances 164a and 164n may vary between working zones 1-5.

Figure 53:
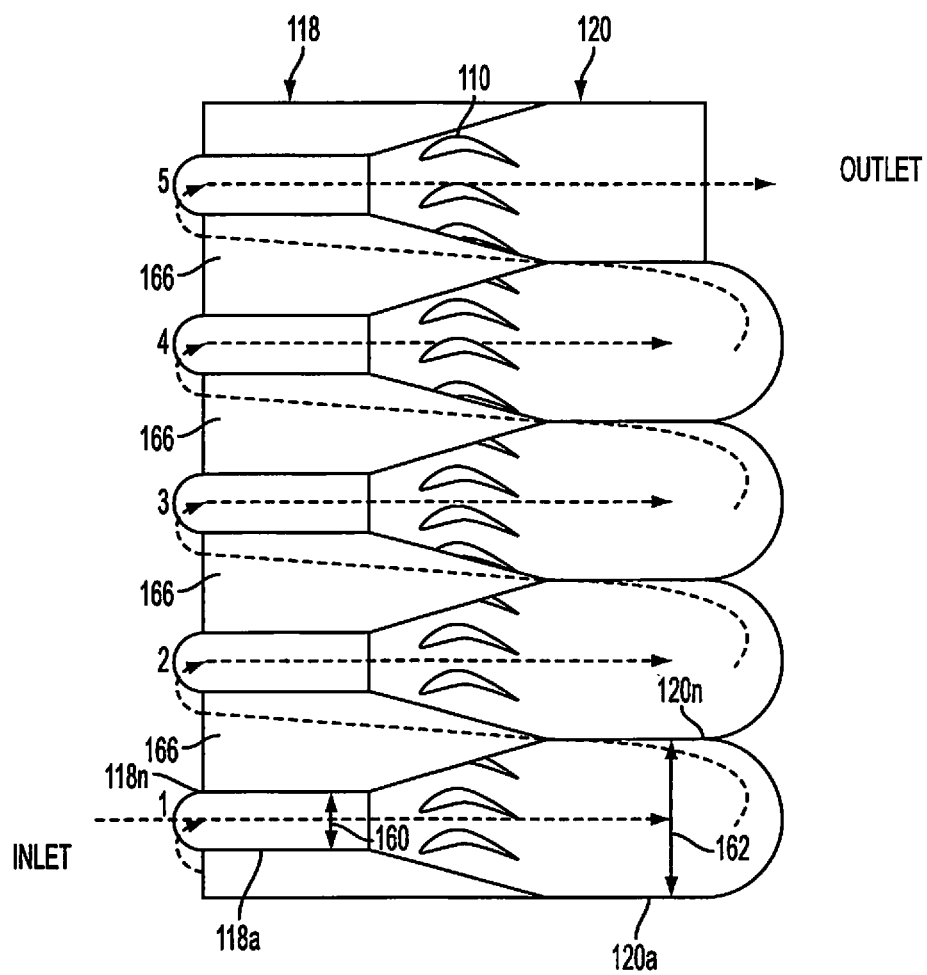

FIG. 53 illustrates an embodiment wherein the inlet and outlet vanes 118 and 120 are not circumferentially offset, but instead are generally coaxial. For each working zone 1-5, the distance 160 between the first inlet vane 118a and the last inlet vane 118n is less than the distance 162 between the first outlet vane 118a and the last outlet vane 118n. In this way, the outlet vanes 120a-120n circumferentially overlap the inlet vanes 118a-118n in both circumferential directions and a diffuser configuration is defined from the inlet vanes 118 to the outlet vanes 120. Again, a closing or sealing portion 166 may be provided between the inlet vanes 118 of adjacent working zones 1-5. As well, the above overlap approach may be accomplished while incorporating some offset.

It is noted that flow through adjacent working zones 1-5 will be at different flow rates. The difference in fluid speed between adjacent zones will typically self seal along the pressure lines, similar to an air shield or air knife. That is, the high velocity flow of fluid prevents or minimizes fluid in one zone from transitioning to another. Under ideal operating conditions, the fluid flow will not spill over from one zone to another zone. However, the apparatus 100 typically remains operational even if the flow spills over between zones.

Figure 54:
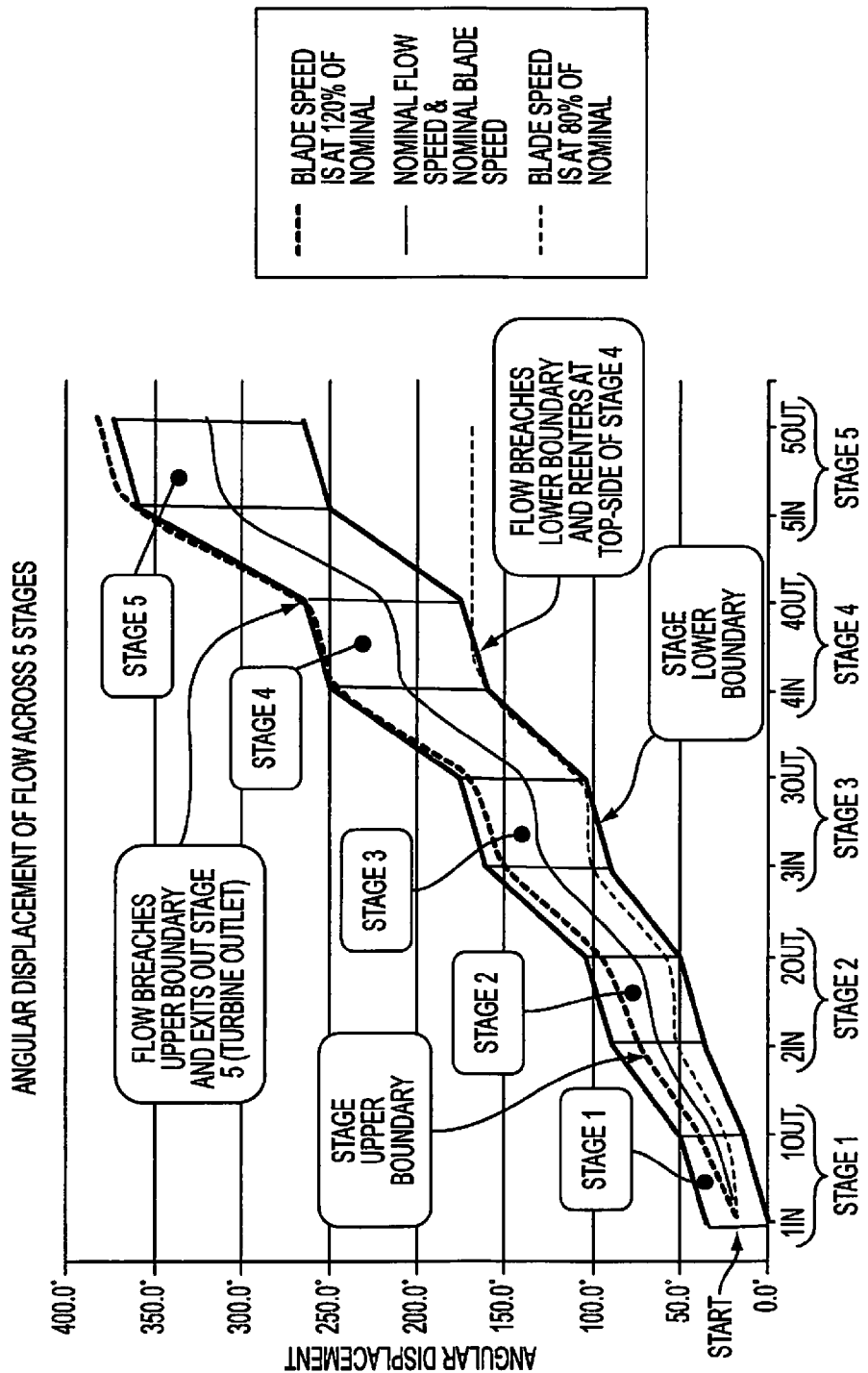
FIG. 54 is a graph illustrating exemplary angular displacement of flow across a five zone fluid working apparatus of at least on embodiment of the present invention.

FIG. 54 illustrates the angular displacement of flow across five stages or zones of the apparatus 100. The figure shows the cumulative effects of the flow of the working fluid as the blade speed becomes disproportionate to the design speed (flow channel prescription). The solid center line shows the nominal flow of the working fluid as it would be contained dominantly within the flow channels when the blade speed is best matched to the housing configuration for a particular application of working fluid flow conditions. The upper dashed line represents the shifting position of the flow as the blade speed becomes faster than the design speed. This might occur when load is removed from the shaft, and the rotors would therefore likely speed up, until the working fluid flows were cut back. As noted, if the flow goes above a boundary level, the flow may spill over into the forward zone. The spilled over flow may then simply provide work within the next zone until the fluid flow is corrected and/or re-balanced.

Likewise, the lower dashed line represents the condition where the rotor speed is slower than the proposed housing configuration nominal. This condition would likely occur when load (or additional load) is applied to the shaft, and the load increase causes slowing of the working assembly, until such a point when the operating parameters are adjusted to bring operation back to nominal. If the flow goes below a boundary level, the flow may spill over and reenter the same stage. Again, the design is tolerant of this condition as the spillover will be useful as it has the potential to perform work in the next successive pass until the fluid flow is corrected.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and not be interpreted in an idealized or overly formal sense unless expressly so defined herein.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and content of the invention as defined.

What is claimed:

1. An apparatus, comprising:
   a housing structure with a first housing inlet and a first housing outlet;
   a working assembly having an inlet side and an outlet side with at least one first rotor having a plurality of rotor blades positioned between the inlet and outlet sides, the working assembly positioned in the housing structure such that the at least one first rotor is rotatably supported therein;
   at least one single return chamber returning fluid flow from the outlet side of the working assembly to the inlet side of the working assembly; and
   a whole quantity of working fluid which flows through elements of the apparatus in the sequential order and manner specified below:
   (a) the first housing inlet in a direction towards a first circumferential portion of a circumferential inlet area defined between the housing structure and the inlet side of the working assembly;
   (b) the first circumferential portion of the circumferential inlet area in a direction towards the outlet side of the working assembly while workingly engaging a first subset of the plurality of rotor blades;
   (c) a first circumferential portion of a circumferential outlet area defined between the housing structure and the outlet side of the working assembly;
   (d) the at least one single return chamber in a direction towards a second circumferential portion of the circumferential inlet area;
   (e) the second circumferential portion of the circumferential inlet area in a direction towards the outlet side of the working assembly while exclusively workingly engaging a second subset of the plurality of rotor blades; and
   (f) the first housing outlet.

2. The apparatus according to claim 1, wherein the working assembly further includes at least one stator positioned adjacent to the at least one first rotor.

3. The apparatus according to claim 1, wherein the working assembly includes at least one second rotor.

4. The apparatus according to claim 3, wherein a stator is positioned in between each adjacent pair of rotors.

5. The apparatus according to claim 3, wherein each of the first and second rotors is supported on the same shaft.

6. The apparatus according to claim 3, wherein the at least one first rotor supported on a first shaft and the second rotor is supported on a second shaft, with the first and second shafts rotating in the same direction or opposite direction.

7. The apparatus according to claim 6, wherein the first and second shafts are configured to be selectively coupled or uncoupled from one another.

8. The apparatus according to claim 1, further comprising at least N return assemblies, wherein N is an integer equal to 2 or more, such that the working fluid passes from the inlet side to the outlet side at least N+1 times and thereby workingly engages at least N+1 subsets of rotor blades before passing out of the first housing outlet.

9. The apparatus according to claim 8, wherein the number of rotor blades in each subset of rotor blades is equal.

10. The apparatus according to claim 8, wherein the number of rotor blades in at least one of the subsets of rotor blades is different from the number of rotor blades in another of the subsets of rotor blades.

11. The apparatus according to claim 1, wherein the working assembly is an expander.

12. The apparatus according to claim 1, wherein the working assembly is a compressor.

13. The apparatus according to claim 1, wherein the housing structure includes an inner housing member and an outer housing member, and the at least one single return chamber is defined by boundary vanes extending radially between the inner and outer housing members.

14. The apparatus according to claim 13, wherein each boundary vane is circumferentially offset from the inlet side to the outlet side in a direction which is the same as the direction of rotation of the at least one first rotor to create a pro-grade return flow.

15. The apparatus according to claim 13, wherein each boundary vane is circumferentially offset from the inlet side to the outlet side in a direction opposite from the direction of rotation of the at least one first rotor to create a retro-grade return flow.

16. The apparatus according to claim 1, further comprising:
   X second housing inlets and X second housing outlets, wherein X is an integer equal to 2 or more, with a distinct flow path defined between each said second housing inlets and a corresponding one of said second housing outlets; and
   at least one return assembly defined along each flow path such that the working fluid traveling along each flow path passes from the inlet side to the outlet side at least two times and thereby workingly engages at least two subsets of rotor blades before passing out of the respective first or second housing outlet.

17. The apparatus according to claim 1, further comprising a generating or motor unit supported within the housing structure and operating in association with rotation of the at least one first rotor.

18. The apparatus according to claim 17, wherein the generating or motor unit is electrically associated with one or more fixed magnets supported within the housing adjacent to the working assembly and one or more rotating magnets mounted on the at least one first rotor in alignment with the fixed magnets.

19. The apparatus according to claim 17, wherein the generating or motor unit converts mechanical energy to electrical energy.

20. The apparatus according to claim 17, wherein the generating or motor unit is sealed within the housing.

21. A method of causing a fluid to flow through an apparatus, comprising:
   causing a whole quantity of the fluid to flow through elements of the apparatus in the sequential order and manner specified below:
   (a) a housing inlet of a housing structure in a direction towards a first circumferential portion of a circumferential inlet area defined between the housing structure and an inlet side of a working assembly, the working assembly including at least one rotor having a plurality of rotor blades;
   (b) the first circumferential portion of the circumferential inlet area in a direction towards an outlet side of the working assembly while workingly engaging a first subset of the plurality of rotor blades;
   (c) a first circumferential portion of a circumferential outlet area defined between the housing structure and the outlet side of the working assembly;
   (d) a single return chamber in a direction towards a second circumferential portion of the circumferential inlet area;
   (e) the second circumferential portion of the circumferential inlet area in a direction towards the outlet side of the working assembly while workingly engaging a second subset of the plurality of rotor blades; and
   (f) a housing outlet of the housing structure.

* * * * *